United States Patent
Nakagawa

(10) Patent No.: US 10,084,701 B2
(45) Date of Patent: Sep. 25, 2018

(54) PACKET RELAYING METHOD AND NON-TRANSITORY COMPUTER-READABLE RECORDING MEDIUM

(71) Applicant: FUJITSU LIMITED, Kawasaki-shi, Kanagawa (JP)

(72) Inventor: Yukihiro Nakagawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 47 days.

(21) Appl. No.: 15/366,012

(22) Filed: Dec. 1, 2016

(65) Prior Publication Data

US 2017/0214610 A1    Jul. 27, 2017

(30) Foreign Application Priority Data

Jan. 25, 2016  (JP) .................................. 2016-011473

(51) Int. Cl.
| | |
|---|---|
| *H04L 12/26* | (2006.01) |
| *H04L 12/721* | (2013.01) |
| *H04L 12/46* | (2006.01) |
| *H04L 12/741* | (2013.01) |
| *H04L 12/725* | (2013.01) |

(52) U.S. Cl.
CPC .......... *H04L 45/70* (2013.01); *H04L 12/4641* (2013.01); *H04L 43/062* (2013.01); *H04L 43/0852* (2013.01); *H04L 45/306* (2013.01); *H04L 45/745* (2013.01)

(58) Field of Classification Search
CPC ... H04L 45/70; H04L 45/306; H04L 43/0852; H04L 12/4641; H04L 45/745; H04L 43/062

See application file for complete search history.

(56) References Cited

U.S. PATENT DOCUMENTS

| | | | | |
|---|---|---|---|---|
| 2003/0012212 | A1* | 1/2003 | Earnshaw | H04L 1/1621 370/428 |
| 2014/0362682 | A1* | 12/2014 | Guichard | H04L 41/5038 370/221 |
| 2015/0333930 | A1 | 11/2015 | Aysola et al. | |
| 2016/0006651 | A1 | 1/2016 | Guichard et al. | |
| 2016/0142474 | A1 | 5/2016 | Itsumi et al. | |

FOREIGN PATENT DOCUMENTS

| | | |
|---|---|---|
| JP | 2013-0240017 | 11/2013 |
| JP | 2015-041198 | 3/2015 |
| JP | 2015-043528 | 3/2015 |
| WO | 2014/0208538 | 12/2014 |

OTHER PUBLICATIONS

European Extended Search Report dated Jun. 26, 2017, for corresponding European Patent Application No. 16202164.6, 9 pages.
Quinn, P. et al., "Network Service Header", Jan. 19, 2016, pp. 11-19, URL:https://tools.ietf.org/html/draft-ietf-sfc-nsh-O2.

* cited by examiner

*Primary Examiner* — Afshawn M Towfighi
(74) *Attorney, Agent, or Firm* — Fujitsu Patent Center

(57) ABSTRACT

A packet relaying method conducted by a computer, the packet relaying method includes controlling whether each of a plurality of packets is transferred to a first service function in accordance with a time interval between two adjacent packets of the plurality of packets and a delay time due to processing performed by the first service function, when the first service function of a plurality of service functions of a virtualized network included in a transfer route of the plurality of packets is excluded from the transfer route.

11 Claims, 30 Drawing Sheets

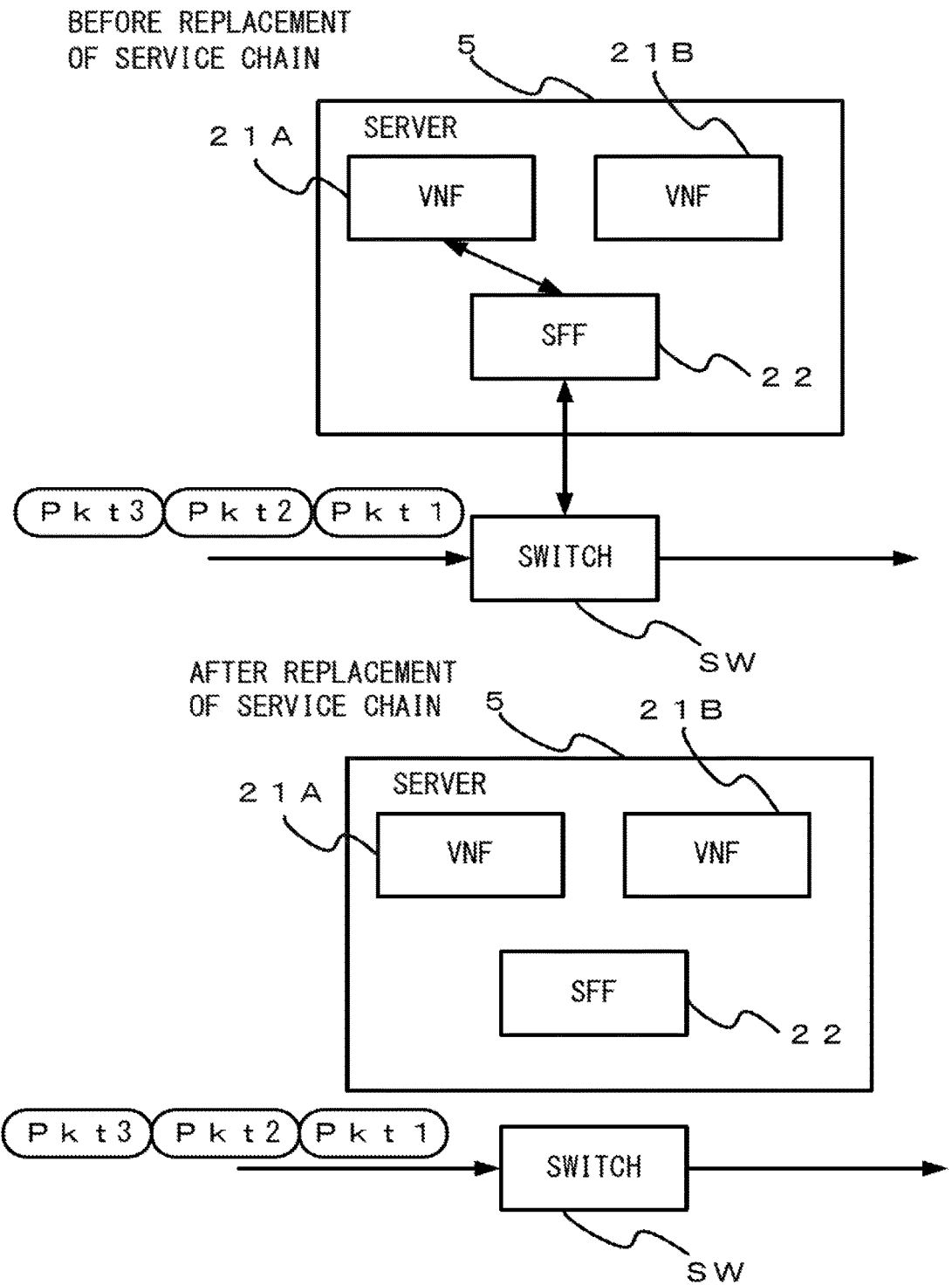
F I G. 5

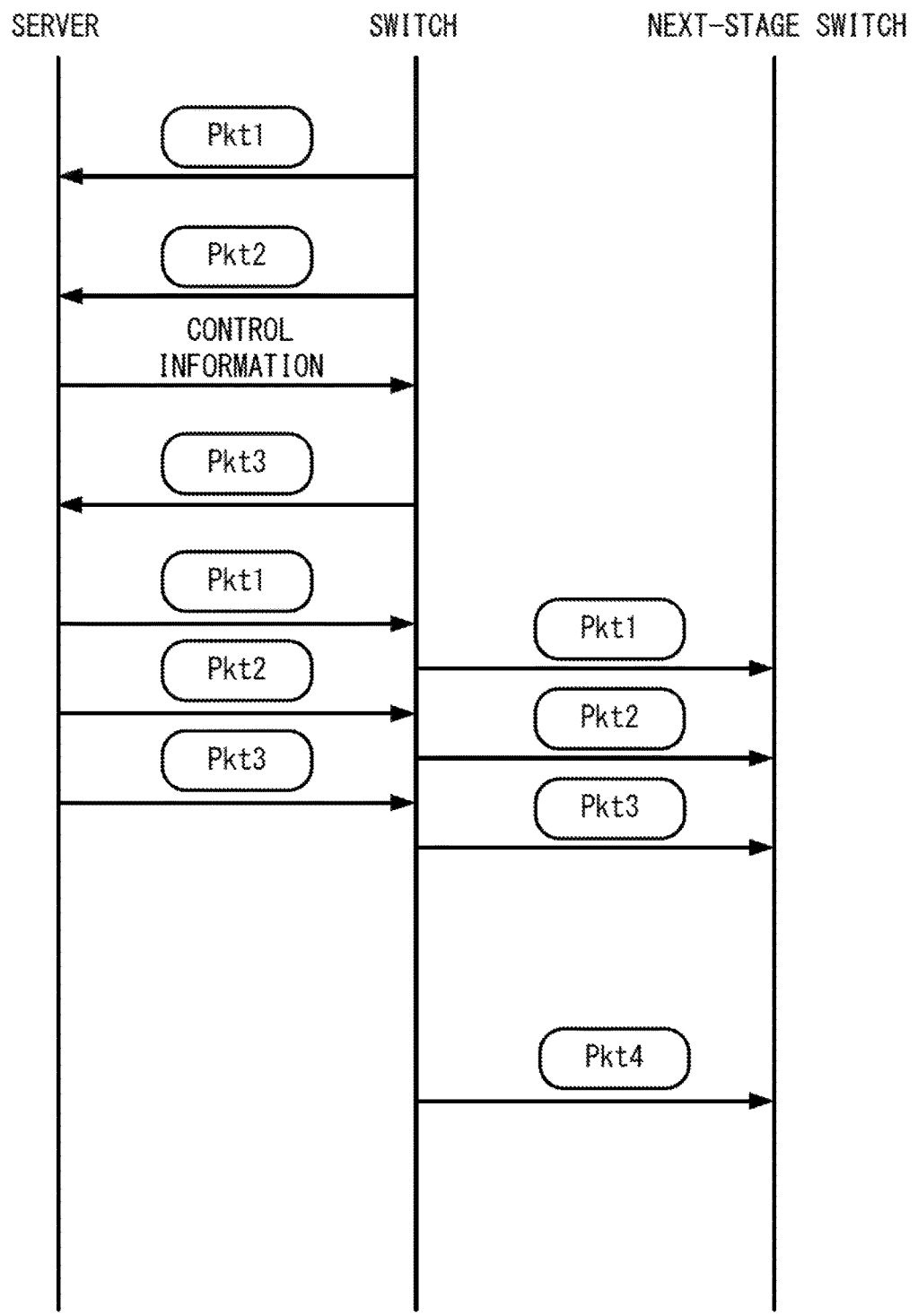
F I G. 8

REPLACEMENT TABLE

| FLOW | Service Path ID | Service Index | TIME STAMP | DELAY TIME | NEXT-STAGE SFF ADDRESS | REPLACEMENT |
|---|---|---|---|---|---|---|
| 5-TUPLE | 100 | 127 | Ta | 5ms | MACa, IPa | COMPLETED |

FIG. 11

| SERVICE HEADER | SEARCH CONDITION | RESULT | PROCESSING | RESULT | PROCESSING |
|---|---|---|---|---|---|
| PRESENT | SEARCH SWITCH-SIDE TRANSFER CONTROL TABLE | HIT | PERFORM TRANSFER CONTROL ACCORDING TO PACKET INTERVAL AND DELAY TIME | — | — |
| | | MISS | SEARCH FDB | HIT | OUTPUT TO PORT OF HIT ENTRY |
| | | | | MISS | FLOODING |
| ABSENT | SEARCH FDB | HIT | OUTPUT TO PORT OF HIT ENTRY | — | — |
| | | MISS | FLOODING | — | — |

FIG. 13

CONTROLLER TABLE

| FLOW | Service Path ID | Service Index | NEXT-STAGE SFF ADDRESS | REPLACEMENT |
|---|---|---|---|---|
| 5-TUPLE(a) | 100 | 127 | MACa, IPa | COMPLETED |
| 5-TUPLE(b) | 200 | 255 | MACb, IPb | BEING REQUESTED |

F I G. 1 4

DELAY INFORMATION TABLE

| FLOW | DELAY TIME |
|---|---|
| 5-TUPLE | 5ms |

DELAY INFORMATION TABLE

| FLOW | Service Path ID | Service Index | DELAY INFORMATION | SFF ADDRESS THAT IS TWO AHEAD | INTERVAL ADJUSTMENT |
|---|---|---|---|---|---|
| 5-TUPLE | 100 | 127 | 5ms | MACa, IPa | COMPLETED |

REPLACEMENT TABLE (FOR EACH FLOW)

| FLOW | Service Path ID | Service Index | TIME STAMP | DELAY TIME | NEXT-STAGE SFF ADDRESS | REPLACEMENT |
|---|---|---|---|---|---|---|
| 5-TUPLE | 100 | 127 | Ta | 5ms | MACa, IPa | COMPLETED |

EPLACEMENT TABLE (FOR EACH VNF)

| VNF | Service Path ID | Service Index | DELAY TIME |
|---|---|---|---|
| VNF-1 | 100 | 127 | 5ms |

F I G. 2 8

PACKET RELAYING METHOD AND NON-TRANSITORY COMPUTER-READABLE RECORDING MEDIUM

CROSS-REFERENCE TO RELATED APPLICATION

This application is based upon and claims the benefit of priority of the prior Japanese Patent Application No. 2016-011473, filed on Jan. 25, 2016, the entire contents of which are incorporated herein by reference.

FIELD

The embodiments discussed herein are related to a packet relaying method and a non-transitory computer-readable recording medium.

BACKGROUND

Conventionally, dedicated hardware is used for a communication device such as a router or a gateway. In recent years, a technology to virtualize functions relating to network services of various communication devices (hereinafter referred to as network service functions) as software on a general-purpose server (network functions virtualization (NFV)) has been put into practical use.

As a related technology, a technology has been proposed in which a cloud controller migrates a virtual machine (VM) into a base that has the largest number of communication sessions to the VM (see, for example, Patent Document 1).

A technology has also been proposed that includes means for selecting a transfer destination of a packet that will be transferred to a plurality of routes in order to establish a communication session with a communication function from among a plurality of virtual machines, and means for transferring the packet to the selected virtual machine (see, for example, Patent Document 2).

Further, a technology has been proposed for managing a wide area network (WAN) and an NW function cloud as separate networks and linking network control between the WAN and the NW function cloud (see, for example, Patent Document 3).

Furthermore, a technology has been proposed for measuring a network delay by referencing flow information stored in a flow information database and calculating a difference between the time when a packet was transmitted via a port of a transfer device and the time when a response packet to the packet was received (see, for example, Patent Document 4).

[Patent Document 1] Japanese Laid-open Patent Publication No. 2015-41198
[Patent Document 2] International Publication Pamphlet No. 2014-208538
[Patent Document 3] Japanese Laid-open Patent Publication No. 2015-43528
[Patent Document 4] Japanese Laid-open Patent Publication No. 2013-240017

SUMMARY

According to an aspect of the embodiments, a packet relaying method conducted by a computer, the packet relaying method includes controlling whether each of a plurality of packets is transferred to a first service function in accordance with a time interval between two adjacent packets of the plurality of packets and a delay time due to processing performed by the first service function, when the first service function of a plurality of service functions of a virtualized network included in a transfer route of the plurality of packets is excluded from the transfer route.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates an example of replacing a service chain so as to invert a packet order.
FIG. 8 is a sequence chart illustrating an example of processing for replacing a service chain according to an embodiment.
FIG. 11 illustrates an example of a replacement table.
FIG. 13 illustrates an example of an index of processing performed by a packet relay control unit.
FIG. 14 illustrates an example of a controller table.
FIG. 20 illustrates an example of a delay information table in Application Example 1.
FIG. 25 illustrates an example of a delay information table in Application Example 2.

FIG. 28 illustrates an example of a replacement table in Application 3.

DESCRIPTION OF EMBODIMENTS

When a communication flow including a plurality of packets goes through a plurality of service functions in a virtualized network (virtual network functions (VNFs)), service functions of the respective VNFs perform prescribed processing on the packets included in the communication flow. A transfer route of the communication flow may be dynamically changed.

When a change is made such that a VNF is excluded from the transfer route while some packets in the communication flow are being processed by the VNF, the order of the respective packets in the communication flow is inverted, and the order may become inappropriate.

<An Example of the Entire Configuration of a System According to an Embodiment>

Figure 1:
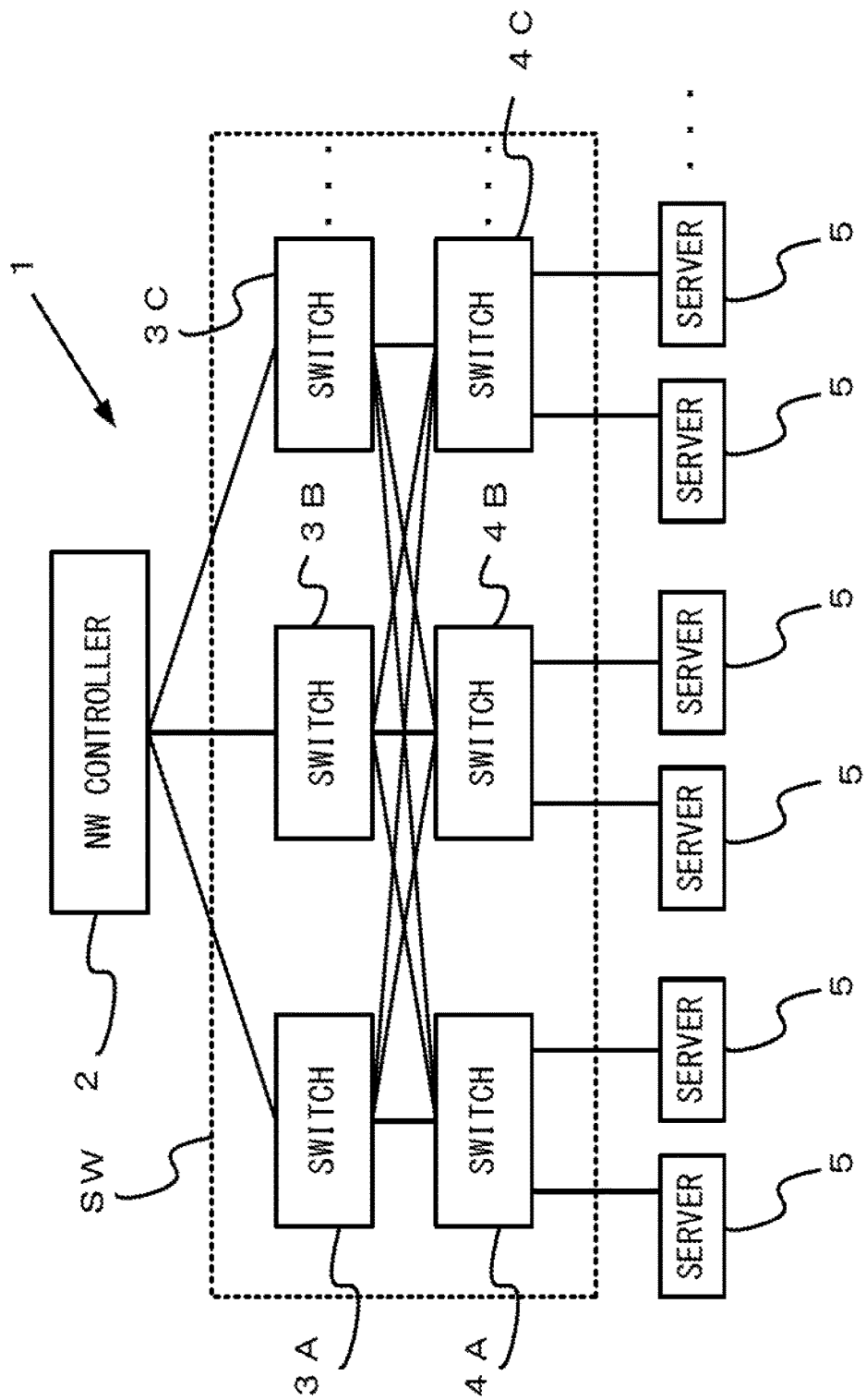
FIG. 1 illustrates an example of the entire configuration of a system.

An embodiment is described below with reference to the drawings. FIG. 1 illustrates an example of the entire configuration of a system 1 according the embodiment. In the system 1, a plurality of switches 3A, 3B, 3C, . . . (hereinafter, these switches may be collectively referred to as switches 3) are connected to a network controller (in FIG. 1, illustrated as an NW controller) 2.

In addition, a plurality of switches 4A, 4B, 4C, . . . (hereinafter, these switches may be collectively referred to as switches 4) are respectively connected to the switches 3.

The respective switches 3 are referred to, for example, as spine switches. The respective switches 4 are referred to, for example, as leaf switches. The respective switches 3 and the respective switches 4 are collectively referred to as switches SW.

The switch SW is not limited to a switch that includes a spine switch and a leaf switch. One or more servers 5 are connected to each of the switches 4. FIG. 1 illustrates an example in which two servers 5 are connected to one switch 4. The switch SW is an example of a communication control device or a computer.

The server 5 is an example of an information processing device or a computer, and a network service function is performed by software on the server 5. Consequently, the network service function (hereinafter simply referred to as a service function) is virtualized on the server 5.

As an example, the server 5 may be a general-purpose server. The service function may be, for example, a firewall, a router, a deep packet inspection (DPI), a WAN acceleration, a service quality monitor, or the like.

In the embodiment, it is assumed that a communication flow including a plurality of packets goes through respective servers 5, and that the communication flow is processed by virtualized service functions (VNFs) in the respective servers 5. The communication flow includes a plurality of packets for which the order is designated.

A scheme for transferring a communication flow to a plurality of VNFs via a prescribed transfer route is sometimes referred to as service chaining. Hereinafter, a transfer route of a communication flow is referred to as a service chain, and a change in the transfer route of the communication flow is referred to as replacement of a service chain.

<An Example of a Switch>

Figure 2:
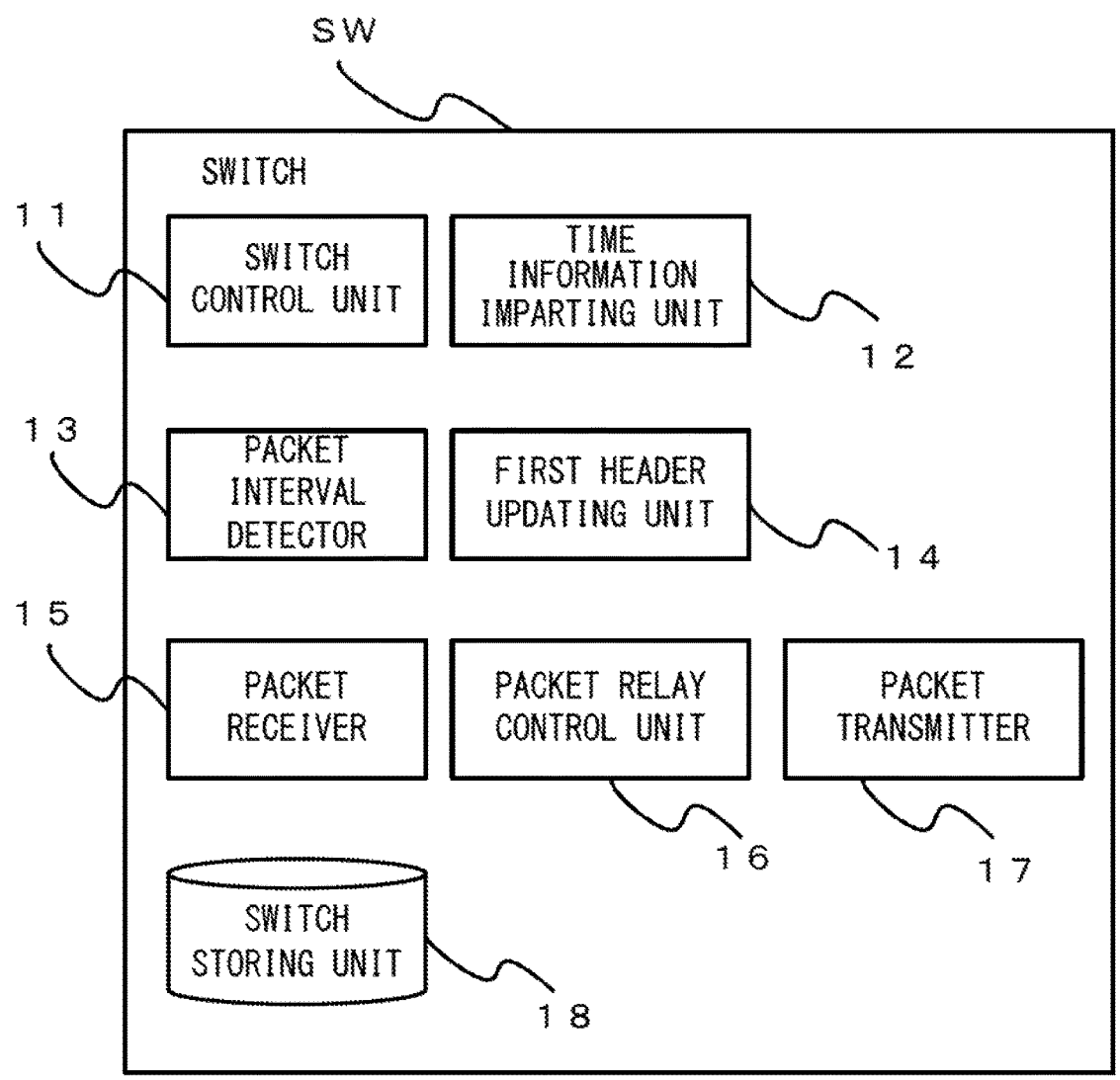
FIG. 2 is a functional block diagram illustrating an example of a switch.

An example of the switch SW is described next with reference to the example of FIG. 2. The switch SW is connected to the server 5. The switch SW includes a switch control unit 11, a time information imparting unit 12, a packet interval detector 13, a first header updating unit 14, a packet receiver 15, a packet relay control unit 16, a packet transmitter 17, and a switch storing unit 18.

The switch control unit 11 performs various controls on the switch SW. The time information imparting unit 12 imparts time information (a time stamp) to respective packets included in a communication flow. As an example, when the packet receiver 15 receives a packet, the time information imparting unit 12 imparts time information to the received packet.

The packet interval detector 13 detects a time interval between two adjacent packets included in a communication flow (hereinafter referred to as a packet interval) on the basis of a difference between the time when a packet was received by the packet receiver 15 and the time when a packet that preceded the packet was received by the packet receiver 15.

The first header updating unit 14 updates (rewrites) a header of the received packet. Consequently, the destination of the received packet is changed. The packet receiver 15 receives the respective packets included in the communication flow from an input port.

The packet relay control unit 16 specifies a transmission destination (an output port) of a packet according to a prescribed condition. The packet transmitter 17 transmits a packet to the output port specified by the packet relay control unit 16.

The switch storing unit 18 stores various types of information. As an example, the switch storing unit 18 may store a forwarding database (FDB) that defines an output port that is a transmission destination of a packet. As an example, the FDB may be a database that indicates a correspondence relationship between a media access control (MAC) address and a port number.

<An Example of a Server>

Figure 3:
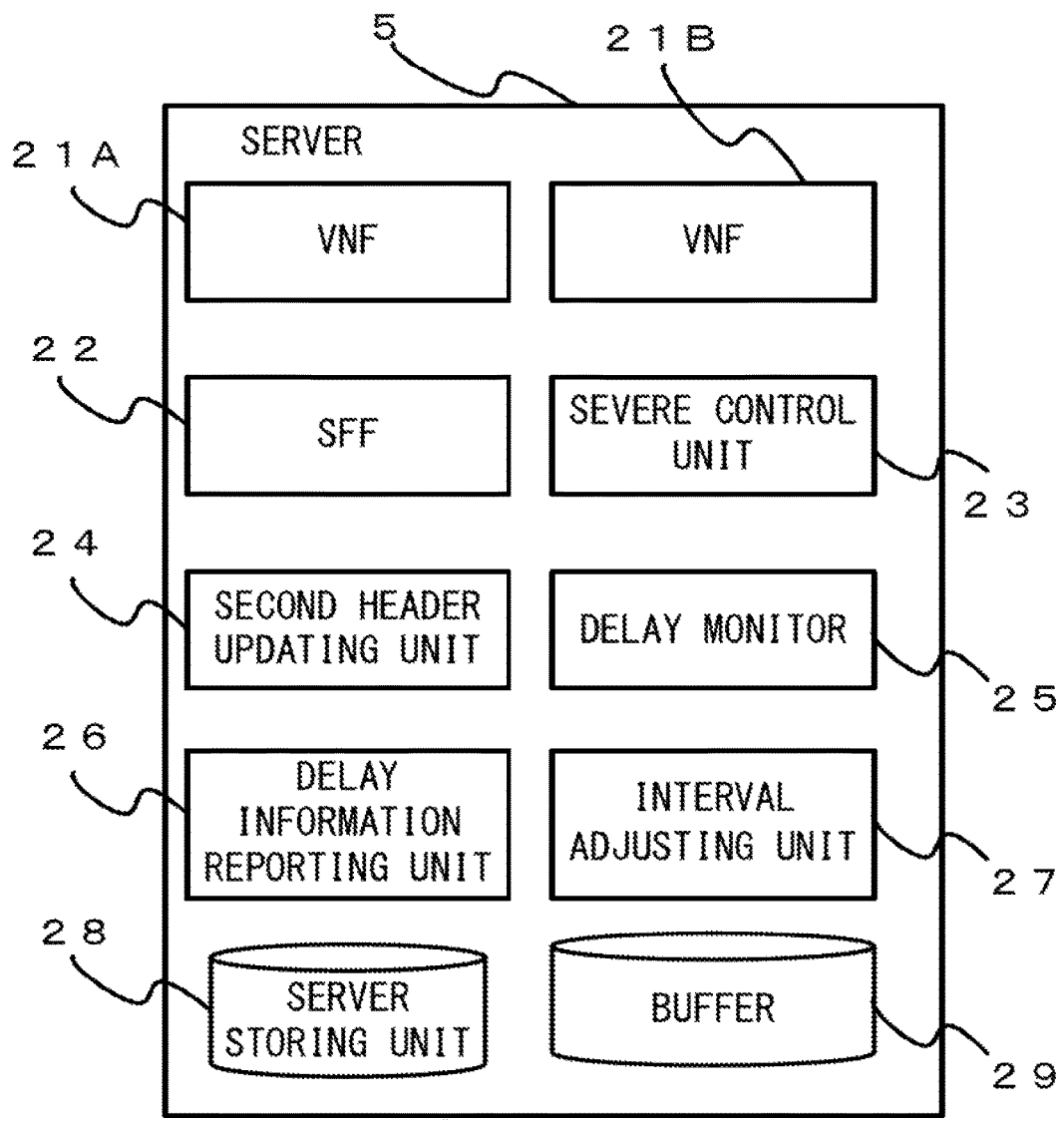
FIG. 3 is a functional block diagram illustrating an example of a server.

An example of the server 5 is described next with reference to the example of FIG. 3. An SFF illustrated in the examples of FIG. 3 and the drawings that follow is an abbreviation for a "Service Function Forwarder".

The server 5 includes VNFs 21A and 21B, an SFF 22, a server control unit 23, a second header updating unit 24, a delay monitor 25, a delay information reporting unit 26, an interval adjusting unit 27, and a server storing unit 28.

The VNFs 21A and 21B are the VNFs described above, and are also referred to as virtual network service functions. FIG. 3 illustrates an example in which the server 5 includes the VNFs 21A and 21B. However, one VNF may be included in the server 5, or three or more VNFs may be included in the server 5. Hereinafter, the VNF 21A or 21B may be referred to as a VNF 21.

The SFF 22 is also referred to as a service function relay unit. The SFF 22 outputs (relays) a packet to the VNF 21. The SFF 22 also receives a packet from the VNF 21. The server control unit 23 performs various controls on the server 5.

The second header updating unit 24 updates (rewrites) a header of a packet. The delay monitor 25 monitors, as a delay time, a time period after the SFF 22 outputs a packet to the VNF 21 and before the packet is input into the SFF 22 from the VNF 21.

The VNF 21 performs processing of a service function on the packet that has been output from the SFF 22. The SFF 22 receives the packet from the VNF 21. Accordingly, the delay time indicates a time period during which the VNF 21 performs processing of a service function. The delay time is also referred to as a packet delay time.

The delay information reporting unit 26 obtains the delay time from the delay monitor 25, and transmits, to the switch SW, control information including the delay time. A bridge protocol data unit (BPDU) may be employed for the control information.

The interval adjusting unit 27 buffers any packet of the respective packets included in the communication flow so as to adjust a packet interval between the buffered packet and the preceding packet.

The server storing unit 28 stores various types of information. A buffer 29 transitorily stores (buffers) a packet received by the server 5.

<An Example of a Network Controller>

Figure 4:
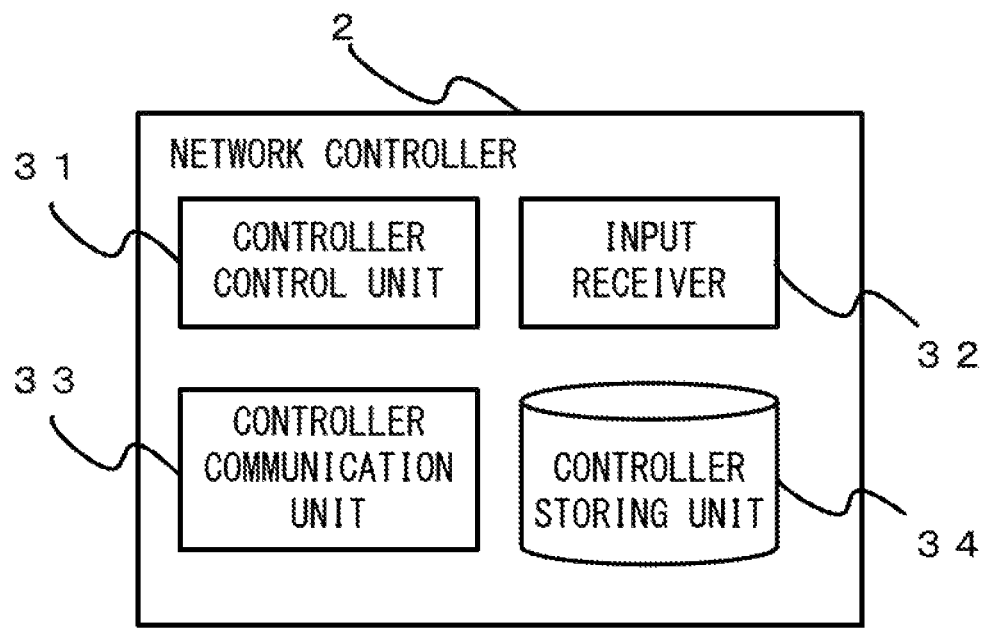
FIG. 4 is a functional block diagram illustrating an example of a network controller.

An example of the network controller 2 is described next with reference to the example of FIG. 4. The network controller 2 includes a controller control unit 31, an input receiver 32, a controller communication unit 33, and a controller storing unit 34.

The controller control unit 31 performs control relating to a service chain of each of the communication flows. The input receiver 32 receives an input operation that an operator of the network controller 2 performs by using an appropriate input device (such as a keyboard or a mouse).

The controller communication unit 33 performs communication with respective switches SW and respective servers 5. The controller storing unit 34 stores a situation of a service chain for each of the communication flows.

<An Example of Replacing a Service Chain so as to Invert a Packet Order>

An example of replacing a service chain so as to invert a packet order is described next. In the example of FIG. 5, it is assumed that the order of packets included in a communication flow is "Pkt1", "Pkt2", "Pkt3".

Before a service chain is replaced, it is assumed that the respective packets in the communication flow are transferred to the server 5 by the switch SW.

In the example of FIG. 5, the SFF 22 references a tag of a packet, and transfers the packet to the VNF 21A. The VNF 21A performs processing of a service function (for example, a firewall or the like) on the transferred packet. The processing of the service function is also referred to as a network service.

The VNF 21A returns the packet on which the processing of the service function has been performed to the SFF 22. The SFF 22 transmits the packet to the switch SW. The switch SW transmits the received packet to a next-stage switch SW.

Hereinafter, the next-stage switch SW is a next switch SW to which a packet is transmitted from the switch SW in a service chain, and a pre-stage switch SW is a switch SW in a pre-stage that transmits a packet to the switch SW in the service chain.

When an operator of the network controller 2 performs an input to replace a service chain on the network controller 2, the input receiver 32 receives the input.

As an example, it is assumed that an input to exclude the server 5 illustrated in the example of FIG. 5 from the service chain has been performed on the network controller 2. In this case, the controller control unit 31 performs control to transmit a service-chain replacement request on each of the servers 5. In the case of the example of FIG. 5, the server 5 is excluded from a service chain after replacement in accordance with the replacement request above.

Accordingly, after the service chain is replaced, the switch SW transmits a packet to the next-stage switch SW without transferring the packet to the server 5. When the service chain is replaced, the communication flow is not transferred to the server 5.

In a case in which the VNF 21 does not perform the processing of the service function on the respective packets in the communication flow, transmission and reception of packets between the switch SW and the server 5 is useless traffic, and a communication efficiency is reduced. In addition, a load is applied to the server 5 due to the useless traffic.

Therefore, in a case in which respective VNFs 21 in the server 5 are excluded from the service chain, the switch SW does not transfer packets to the server 5.

Figure 6:
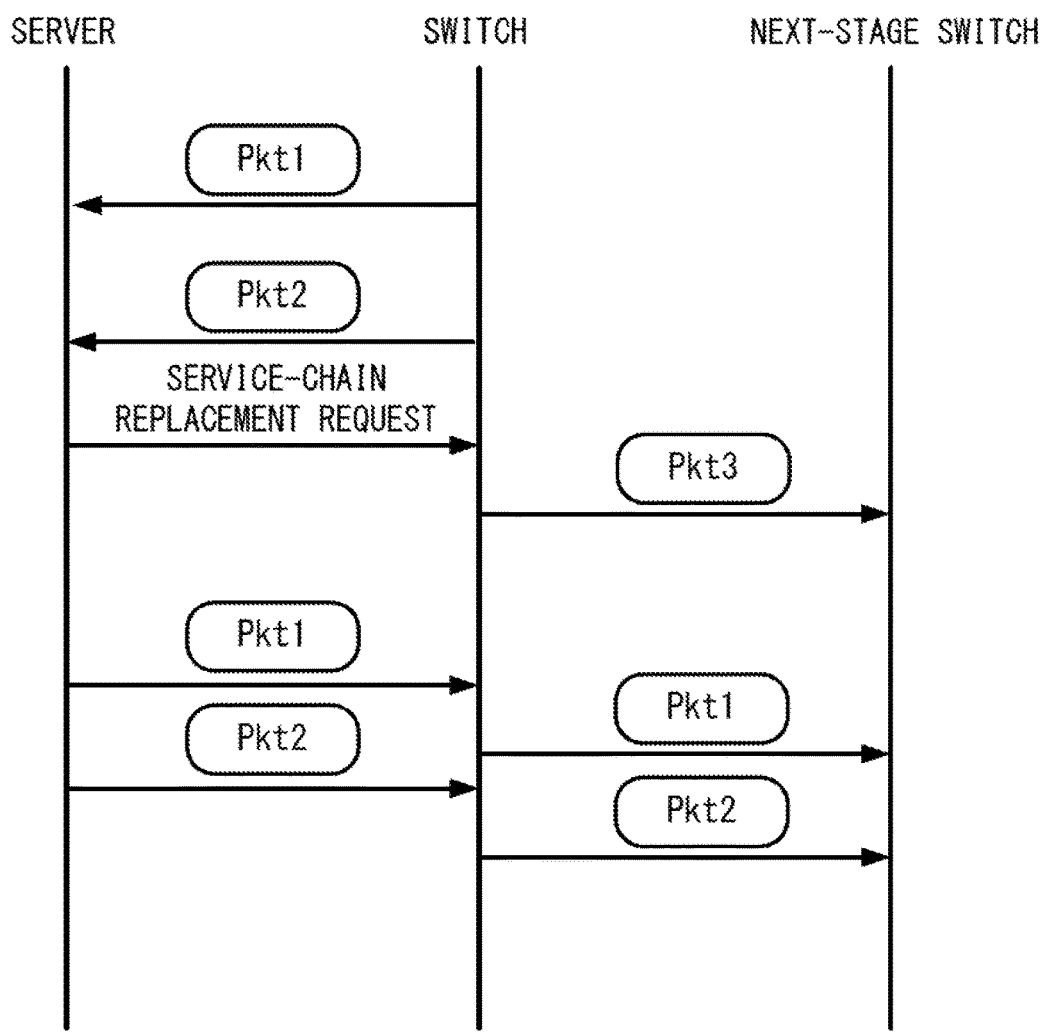
FIG. 6 is a sequence chart illustrating an example of processing for replacing a service chain so as to invert a packet order.

FIG. 6 illustrates an example of a sequence chart in the example of FIG. 5. The switch SW performs control to transfer respective packets included in the communication flow to the server 5. In the case of the example of FIG. 6, the switch SW transfers "Pkt1" and "Pkt2" in the communication flow to the server 5.

Here, it is assumed that the switch SW received a service-chain replacement request from the server 5 before the switch SW receives the packet "Pkt3" from a pre-stage switch SW. In the case of the example of FIG. 5, after the service chain is replaced, the server 5 is excluded from the service chain. A request for this is a service-chain replacement request.

After the switch SW has received the service-chain replacement request, the switch SW does not transfer packets to the server 5. In the example of FIG. 6, after the switch SW has received the service-chain replacement request, the switch SW receives the packet "Pkt3" from the pre-stage switch SW.

Because the switch SW has received the service-chain replacement request, the switch SW does not transfer the packet "Pkt3" to the server 5, and transmits the packet "Pkt3" to a next-stage switch SW. Then, the switch SW receives the packets "Pkt1" and "Pkt2" from the server 5, and transmits these packets to the next-stage switch SW.

In this case, the order of packets in the communication flow becomes "Pkt3", "Pkt1", "Pkt2", and the order of packets is inverted. Namely, the order of the respective packets in the communication flow is not appropriate.

In a case in which the order of the respective packets included in the communication flow is not appropriate, a transmission control protocol (TCP) is retransmitted. When the TCP is retransmitted, a communication efficiency is reduced. When the TCP is retransmitted every time the service chain is replaced, the communication efficiency is further reduced.

It is considered that respective packets are buffered before a service chain is replaced and that the service chain is replaced after all of the VNFs 21 in each of the servers 5 finish processing.

In this case, an amount of information of packets buffered in the switch SW increases, and when the switch SW has a small memory capacity, the packets may overflow. A memory capacity used for the switch SW is often small, and in this case, a packet loss is caused by the overflow of the packets.

Accordingly, in the embodiment, even when the service chain is replaced, the order of respective packets included in a communication flow is made to be maintained in an appropriate state. An example of replacement of a service chain according to the embodiment is described below.

<An Example of Replacement of a Service Chain According to the Embodiment>

Figure 7:
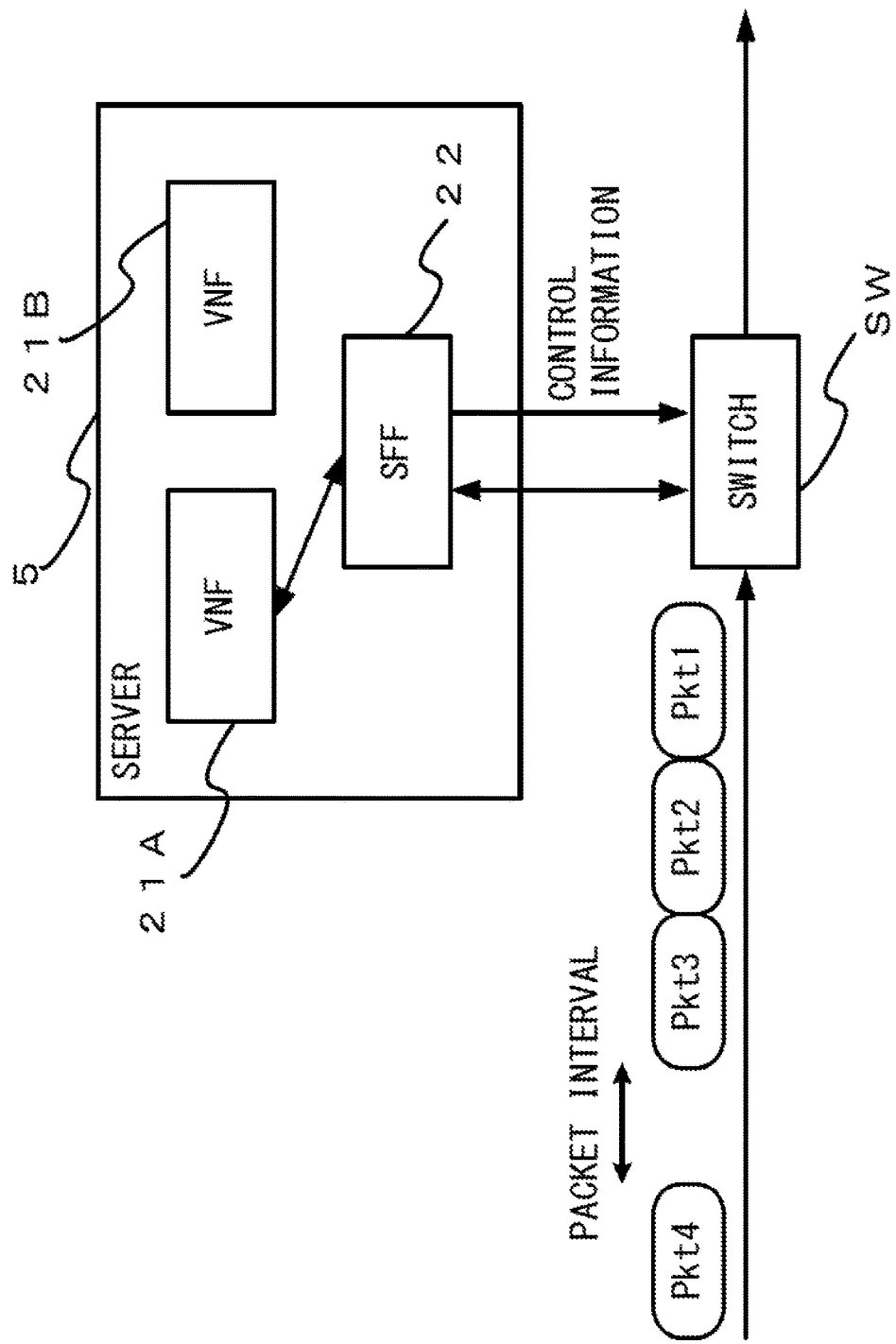
FIG. 7 illustrates an example (no. 1) of replacement of a service chain according to an embodiment.

FIG. 7 illustrates an example of replacement of a service chain according to the embodiment. The order of respective packets included in a communication flow in the example of FIG. 7 is "Pkt1", "Pkt2", "Pkt3", "Pkt4".

As illustrated in the example of FIG. 7, "Pkt1", "Pkt2", and "Pkt3" of the respective packets included in the communication flow are continuous to each other, and there is almost no packet intervals. On the other hand, there is a certain packet interval between "Pkt3" and "Pkt4".

As an example, a certain packet interval may be generated between the packets "Pkt3" and "Pkt4" due to some factors in a network. In this case, the packet "Pkt4" reaches the switch SW after a certain time period has passed after the packet "Pkt3" reached the switch SW.

When the packet receiver 15 of the switch SW receives the respective packets in the communication flow from the pre-stage switch SW, the time information imparting unit 12 imparts time information indicating reception time to the received packets.

The packet interval detector 13 detects a packet interval between two adjacent packets for each of the packets on the basis of the time information for each of the packets included in the communication flow. In the embodiment, the packet interval detector 13 detects a packet interval between one packet of the respective packets and the preceding packet.

There are no packets before the first packet "Pkt1" in the communication flow. Therefore, the packet interval detector 13 detects a packet interval between two adjacent packets for each of the packet "Pkt2" and the packets that follow.

The packet relay control unit 16 performs control in such a way that the packets are transmitted to an output port that corresponds to the destination of the communication flow. The destinations of the packets before replacement of a service chain are the server 5. Accordingly, the packet relay control unit 16 performs control in such a way that the packets are transferred to the server 5.

The packet transmitter 17 transfers the packets to the server 5 when the destinations of the packets are not changed. The delay monitor 25 of the server 5 monitors a delay time after the packets are input into the SFF 22 and are processed by the VNFs 21, and before the packets are output from the SFF 22.

The delay information reporting unit 26 reports control information including the delay time to the switch SW. In the case of the example of FIG. 7, for example, it is assumed that the packets "Pkt1", "Pkt2", and "Pkt3" are input into the SFF 22.

In this case, the delay monitor 25 monitors delay times of the packets "Pkt1", "Pkt2", and "Pkt3". Accordingly, delay times for three packets can be obtained.

The delay monitor 25 may use a time period during which statistical processing is performed on a delay time for each of the packets as the delay time. As an example, the delay monitor 25 may calculate a mean value of delay times for respective packets, and may use the mean value of the delay times as the delay time above.

In this case, the delay information reporting unit 26 reports the mean value of the delay times for the respective packets as a delay time to the switch SW. Hereinafter, it is assumed that the delay time is the mean value of the delay times for the respective packets.

The packet relay control unit 16 of the switch SW compares the packet interval between two adjacent packets that has been detected by the packet interval detector 13 with the delay time that has been reported from the server 5 for each of the packets received by the packet receiver 15.

The packet relay control unit 16 performs control to transfer the received packet to the server 5 when the packet interval is shorter than or equal to the delay time, and the packet relay control unit 16 performs control to transmit the received packet to the next-stage switch SW, not the server 5, when the packet interval is longer than the delay time.

The destination of the packet at the time when the packet receiver 15 receives the packet is the server 5. When the packet interval is longer than the delay time, the packet relay control unit 16 makes the first header updating unit 14 change the destination of the packet to the next-stage switch SW. Consequently, the packet is transmitted to the next-stage switch SW.

In the example of FIG. 7, it is assumed that a packet interval between the packets "Pkt1" and "Pkt2" and a packet interval between the packets "Pkt2" and "Pkt3" are shorter than or equal to the delay time. It is also assumed that a packet interval between the packets "Pkt3" and "Pkt4" is longer than the delay time.

In this case, the destinations of the packets "Pk1", "Pk2", and "Pkt3" are not changed. On the other hand, the destination of the packet "Pkt4" is changed from the server 5 to the next-stage switch SW.

All of the packet intervals between two adjacent packets for the packets "Pkt1" to "Pkt3" are shorter than or equal to the delay time. In this case, when a service chain is replaced, the order of the respective packets may become inappropriate, as described above.

On the other hand, a packet interval between the packets "Pkt3" and "Pkt4" is longer than the delay time. Accordingly, after the VNF 21 finishes processing of a service function on the packet "Pkt3" and the packet "Pkt3" is received by the switch SW, the packet "Pkt4" reaches the switch SW.

Accordingly, the order of the packets "Pkt3" and "Pkt4" is not inverted, and the order is maintained in an appropriate state. Therefore, even when the service chain is replaced, the order of the respective packets included in the communication flow is maintained in an appropriate state under the control of the packet relay control unit 16.

FIG. 8 is a sequence chart in the example of FIG. 7. When the switch SW receives the communication flow above, the switch SW transfers the packet "Pkt1" to the server 5. The switch SW also transfers the packet "Pkt2" to the server 5.

In the example of FIG. 8, after the packet "Pkt2" has been transferred from the switch SW to the server 5, the delay information reporting unit 26 of the server 5 reports control information to the switch SW. Before the server 5 transmit a service-chain replacement request to the switch SW, the server 5 transmits the control information to the switch SW.

Namely, the control information is transmitted from the server 5 to the switch SW before the service chain is replaced. This is because the packet relay control unit 16 determines whether the destination of a packet will be changed on the basis of a delay time after the service chain has been replaced.

The packet interval detector 13 detects a packet interval between the packets "Pkt2" and "Pkt3". The detected packet interval is shorter than or equal to the delay time. Accordingly, the packet relay control unit 16 does not perform control to change the destination of the packet "Pkt3". Therefore, the packet "Pkt3" is transferred to the server 5.

The VNF 21 of the server 5 performs processing of a prescribed service function on the packets "Pkt1", "Pkt2", and "Pkt3" that have been received from the switch SW, changes the destinations of the packets such that the packets are transferred to the next service function, and sequentially transmits these packets to the switch SW.

The packet transmitter 17 of the switch SW transmits the packets "Pkt1", "Pkt2", and "Pkt3" that have been received from the server 5 to a next-stage switch SW.

On the other hand, a packet interval between the packets "Pkt3" and "Pkt4" is longer than the delay time. Accordingly, the packet relay control unit 16 transmits the received packet to the next-stage switch SW without transferring the received packet to the server 5. In this case, the first header updating unit 14 changes the destination of the packet "Pkt4" from the server 5 to the next-stage switch SW.

Accordingly, even when the service chain is replaced, the order of the packets "Pkt1" to "Pkt4" included in the communication flow is maintained in an appropriate state, and the packets "Pkt1" to "Pkt4" are transmitted to the next-stage switch SW.

The communication flow may include one or more packets that follow the packet "Pkt4", namely, the packet "Pkt5", or the packet "Pkt5" and the packets that follow. In this case, the packet relay control unit 16 performs control to change the destinations of the packet "Pkt5" and the packets that follow to the next-stage switch SW.

This is because the service chain was replaced and the server 5 was excluded from a transfer route of the communication flow.

As described above, even when the service chain is replaced, the order of the packet "Pkt4" and the preceding packets is not inverted. Accordingly, the order of the respective packets in the communication flow is maintained in an appropriate state by performing control in such a way that the packet "Pkt4" and the packets that follow are transmitted to the next-stage switch SW.

Figure 9:
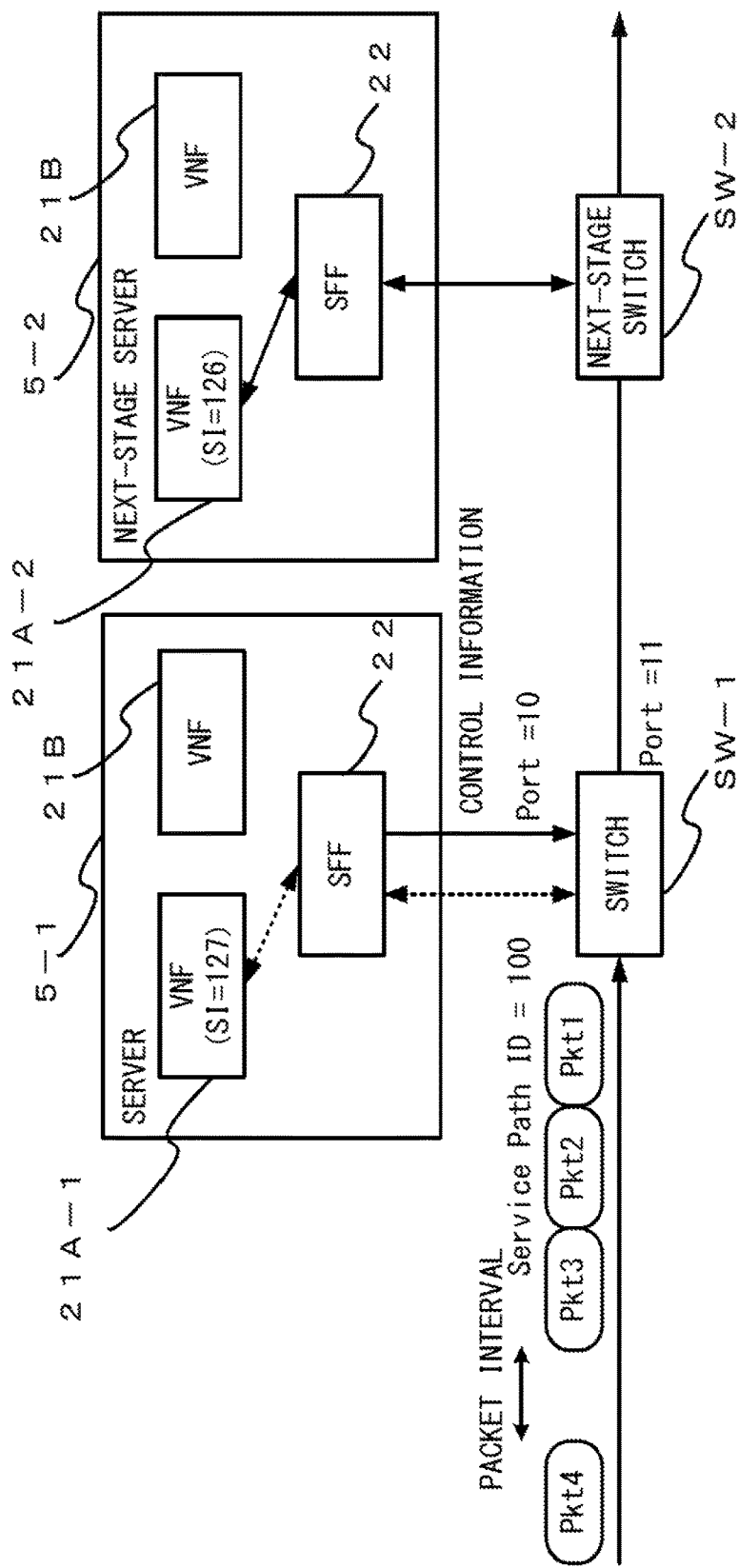
FIG. 9 illustrates an example (no. 2) of replacement of a service chain according to an embodiment.

A detailed example of processing for replacing a service chain is described next. In the example of FIG. 9, it is assumed that each of the packets included in a communication flow is specified according to a service path ID.

In the case of the example of FIG. 9, the service path ID of each of the packets included in the communication flow is "100".

In the examples of FIG. 9 and the drawings that follow, it is assumed that, from among respective switches SW, one switch SW is a switch SW-1, a switch in the next stage of the switch SW-1 is a switch SW-2, and a switch in a pre-stage of the switch SW-1 is a switch SW-0.

A header of each of the packets included in the communication flow includes a network service header (NSH). The switch SW receives various types of packets, and therefore some of the packets received by the switch SW may fail to include the NSH.

Figure 10:
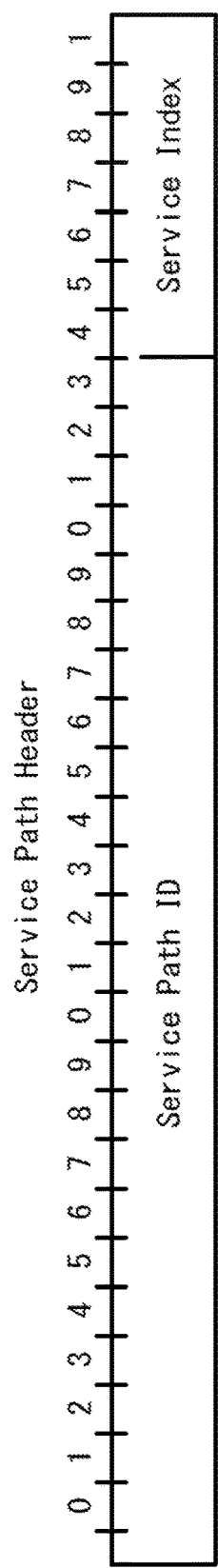
FIG. 10 illustrates an example of a service path header.

The NSH includes a service path header. FIG. 10 illustrates an example of the service path header. The service path header includes a service path ID and a service index. The service path ID indicates an ID that identifies a service chain.

The service index indicates information of an index that identifies a service function that is gone through from among a plurality of service functions included in the service chain. When a packet that includes the service index in a header is processed by a service function, the service index is decremented.

In the example of FIG. 9, the switch SW-1 receives respective packets included in a communication flow from the pre-stage switch SW-0. The packet relay control unit 16 performs control to transfer the packets to a server 5-1 or to transmit the packets to the next-stage switch SW-2 on the basis of a packet interval between each of the packets and the preceding packet, and a delay time.

In the example of FIG. 9, it is assumed that a port number of an output port to the server 5-1 of the switch SW-1 is "10" and that a port number of an output port to the next-stage switch SW-2 is "11".

A service chain before replacement includes a VNF 21A-1. Packet intervals between the packets "Pkt1" to "Pkt3" and the corresponding preceding packets are shorter than or equal to the delay time.

Accordingly, the packet relay control unit 16 performs control to transfer the packets "Pkt1" to "Pkt3" to the server 5-1 via an output port having the port number "10". The packets "Pkt1" to "Pkt3" are transferred to the server 5-1.

After the VNF 21A-1 has performed processing of a service function on the respective packets, the VNF 21A-1 decrements service indices of the respective packets. As an example, when the service indices of the respective packets are "127", the service indices of the respective packets become "126" as a result of processing performed by the VNF 21A-1.

In the example of FIG. 9, "SI=127" indicates that the VNF 21A-1 is the 127th service function of the remaining service functions in a service chain of the packets.

Accordingly, after the VNF 21A-1 has performed processing of a service function on each of the packets, the VNF 21A-1 decrements the service index such that each of the packets is transferred to the next VNF 21A-2.

The VNF 21A-1 is an example of a first service function of a plurality of service functions, and the VNF 21A-2 is a service function next to the first service function, and is an example of a second service function.

The SFF 22 outputs the packets "Pkt1" to "Pkt3" to the VNF 21A-1. The VNF 21A-1 performs processing of a service function on these packets.

The server 5-1 transmits the respective packets on which the processing of the service function has been performed to the switch SW-1. The packet transmitter 17 of the switch SW-1 transmits the packets "Pkt1" to "Pkt3" to the next-stage switch SW-2 via a port having the port number "11".

The packet receiver 15 of the switch SW-1 receives the packet "Pkt4" from a pre-stage switch SW. As described above, a packet interval between the packets "Pkt3" and "Pkt4" that are packets adjacent to each other in the communication flow is longer than the delay time.

The packet relay control unit 16 transmits the packet "Pkt4" to the next-stage switch SW-2 without transferring the packet "Pkt4" to the server 5-1. The same applies to the packets that follow the packet "Pkt4" in the communication flow.

A service index included in a header of the packet "Pkt4" and the packets that follow is "127". A service index included in a header of each of the packets "Pkt1" to "Pkt3" is "126".

Accordingly, the packet relay control unit 16 decrements service indices of packets that are not transferred to the server 5-1. As a result, a service index of each of the packet "Pkt4" and the packets that follow becomes "126".

Consequently, the respective packets included in the communication flow are transferred to the VNF 21A-2 of the next-stage server 5-2. In the example of FIG. 9, an arrow illustrated with a dotted line indicates a packet that is transferred to the server 5-1 from among the respective packets in the communication flow.

Here, specification of a communication flow according to the embodiment is described. In the embodiment, it is assumed that the communication flow is specified by a 5-tuple. The 5-tuple is information that includes a transmission source address, a transmission destination address, a transmission source port, a transmission destination port, and a protocol number. Each of the addresses in the 5-tuple is an Internet protocol (IP) address.

The communication flow may be specified by something other than the 5-tuple. The transmission source address is expressed as "SRC IP", the transmission destination address is expressed as "DST IP", the transmission source port is expressed as "SRC PORT", the transmission destination port is expressed as "DST PORT", and the protocol number is expressed as "Protocol".

FIG. 11 illustrates an example of a table that the packet relay control unit 16 references when the packet relay control unit 16 performs transfer control on a packet (hereinafter the table is referred to as a replacement table). The replacement table is stored in the switch storing unit 18.

The replacement table includes the items "Flow", "Service Path ID", "Service Index", "Time Stamp", "Delay Time", "Next-Stage SFF Address", and "Replacement". The item "Flow" is an item that specifies a communication flow.

In the replacement table, information relating to a plurality of communication flows may be stored. Information relating to one communication flow is stored in one entry in the replacement table, and therefore when there are a plurality of communication flows, the replacement table includes a plurality of entries.

The item "Flow" indicates a communication flow that is specified by a 5-tuple. The items "Service Path ID" and "Service Index" respectively indicate a service path ID and a service index of each of the packets in the communication flow.

The item "Time Stamp" indicates time information that is imparted to a packet by the time information imparting unit 12. The item "Delay Time" indicates a delay time that is included in the control information that the switch SW-1 receives from the server 5-1. The item "Next-Stage SFF Address" indicates an address of the SFF 22 of the next-stage server 5-2. In the example of FIG. 11, the next-stage SFF address is expressed by a MAC address and an IP address.

The item "Replacement" indicates a state of replacement of a service chain. The example of FIG. 11 illustrates that a service chain has been replaced. Replacement is also referred to as service function chaining (SFC) replacement.

Figure 12:
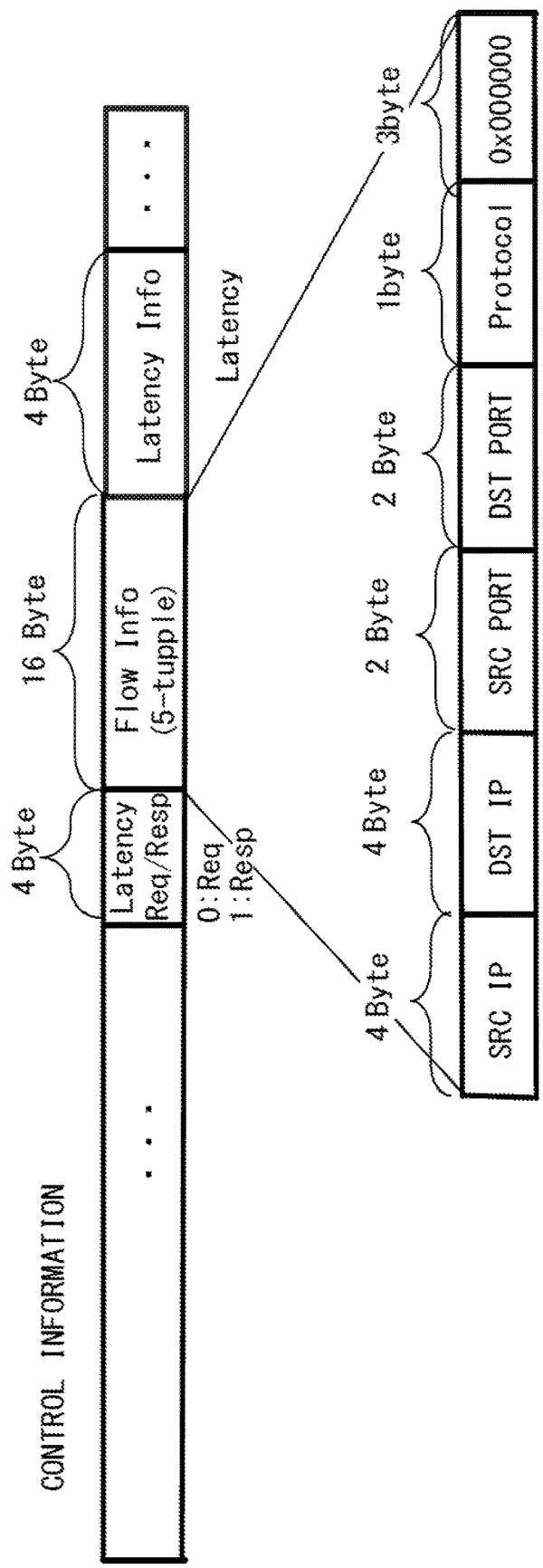
FIG. 12 illustrates an example of control information transmitted to a switch.

FIG. 12 illustrates an example of control information transmitted from the server 5 to the switch SW. In the control information, "Flow Info" is information that specifies a communication flow by using a 5-tuple. "Latency Info" in the control information is information indicating a delay time.

FIG. 13 illustrates an example of a criterion of processing performed by the packet relay control unit 16. The packet relay control unit 16 according to the embodiment processes a packet in accordance with the criterion illustrated in the example of FIG. 13. The item "Service Header" indicates whether the service path header above exists.

When a service header exists in a received packet, the packet relay control unit 16 searches the replacement table for a service index that matches a service index of the received packet.

When a service index that matches a service index of the received packet exists (when the result is a hit), the packet relay control unit 16 performs transfer control on the received packet on the basis of a packet interval and a delay time, as described above.

When a service index that matches a service index of the received packet does not exist (when the result is a miss), the packet relay control unit 16 searches the FDB above that has been stored in the switch storing unit 18. The packet relay control unit 16 references the item "Next-Stage SFF Address" in the replacement table.

The packet relay control unit 16 searches for an entry that matches a MAC address included in a header of the received packet. When an entry exists that matches a MAC address included in a header of the received packet (when the result is a hit), a transmission destination of the packet exists.

The packet relay control unit 16 performs control in such a way that the packet is output via an output port in the hit entry. When an entry does not exist that matches a MAC address included in a header of the received packet (when the result is a miss), the packet relay control unit 16 floods the packet (broadcasts the packet to respective devices that are connected to the switch SW).

When a service header does not exist, the packet relay control unit 16 searches the FDB. When the result is a hit, the packet relay control unit 16 performs control in such a way that the packet is output via an output port in the hit entry. When the result is a miss, the packet relay control unit 16 floods the received packet.

FIG. 14 illustrates an example of a controller table that is managed by the network controller 2. The controller table is a table used to manage respective communication flows under the management of the network controller 2, and the controller table is stored in the controller storing unit 34. The controller table of FIG. 14 includes two entries.

The controller table includes the items "Flow", "Service Path ID", "Service Index", "Next-Stage SFF Address", and "Replacement". The respective items in the controller table are similar to corresponding items of the respective items in the replacement table.

<A Flowchart Indicating a Flow of Processing According to the Embodiment>

Figure 15:
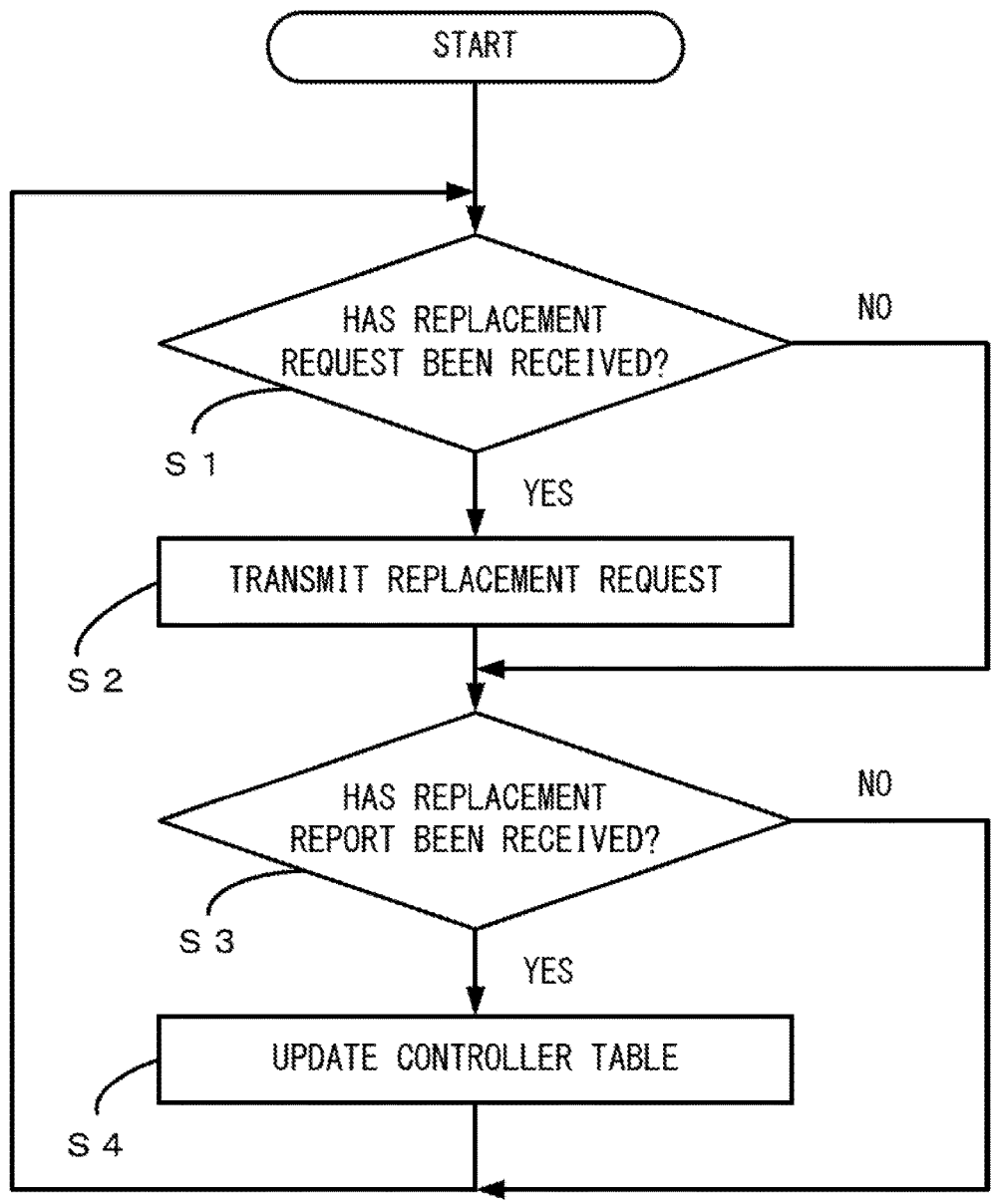
FIG. 15 is a flowchart (no. 1) illustrating an example of processing according to an embodiment.

FIG. 15 illustrates an example of processing performed by the network controller 2. It is determined whether the input receiver 32 has received a service-chain replacement request (step S1).

When the input receiver 32 has received the request (YES in step S1), the controller control unit 31 performs control to transmit a request to replace a service chain to respective servers 5 that are included in a service chain of a communication flow that is a target for the replacement request. The controller communication unit 33 transmits the request (step S2). When the input receiver 32 has not received the request (NO in step S1), the process of step S2 is not performed.

Each of the servers 5 that has received the request replaces the service chain, and transmits, to the network controller 2, a report indicating that the service chain has been replaced. The controller control unit 31 determines whether the report has been received (step S3).

When the report has been received (YES in step S3), the controller control unit 31 updates information relating to the service chain in the controller table that has been stored in the controller storing unit 34 (step S4). When the report has not been received (NO in step S3), the process of step S4 is not performed.

Figure 16:
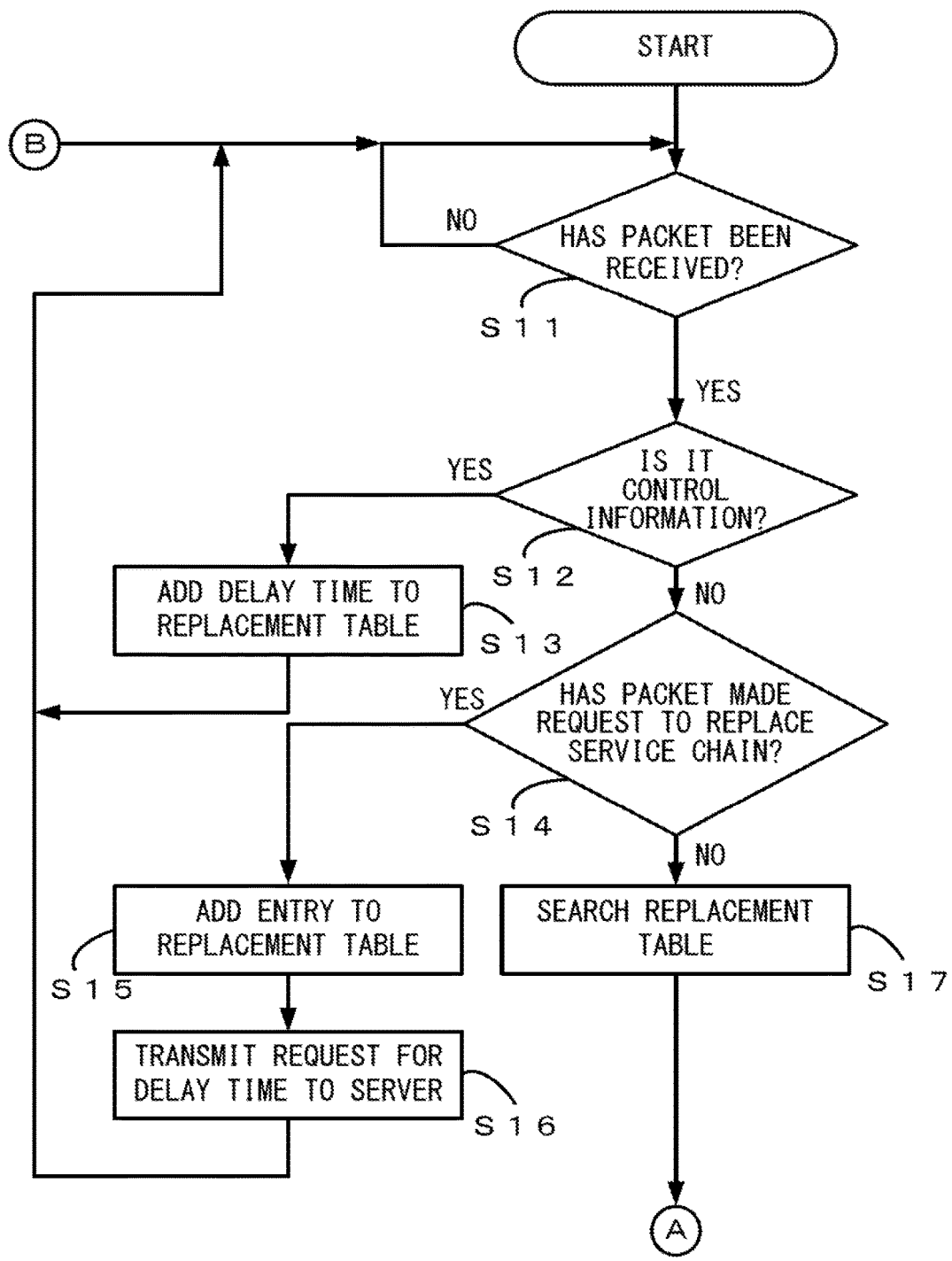
FIG. 16 is a flowchart (no. 2) illustrating an example of processing according to an embodiment.
Figure 17:
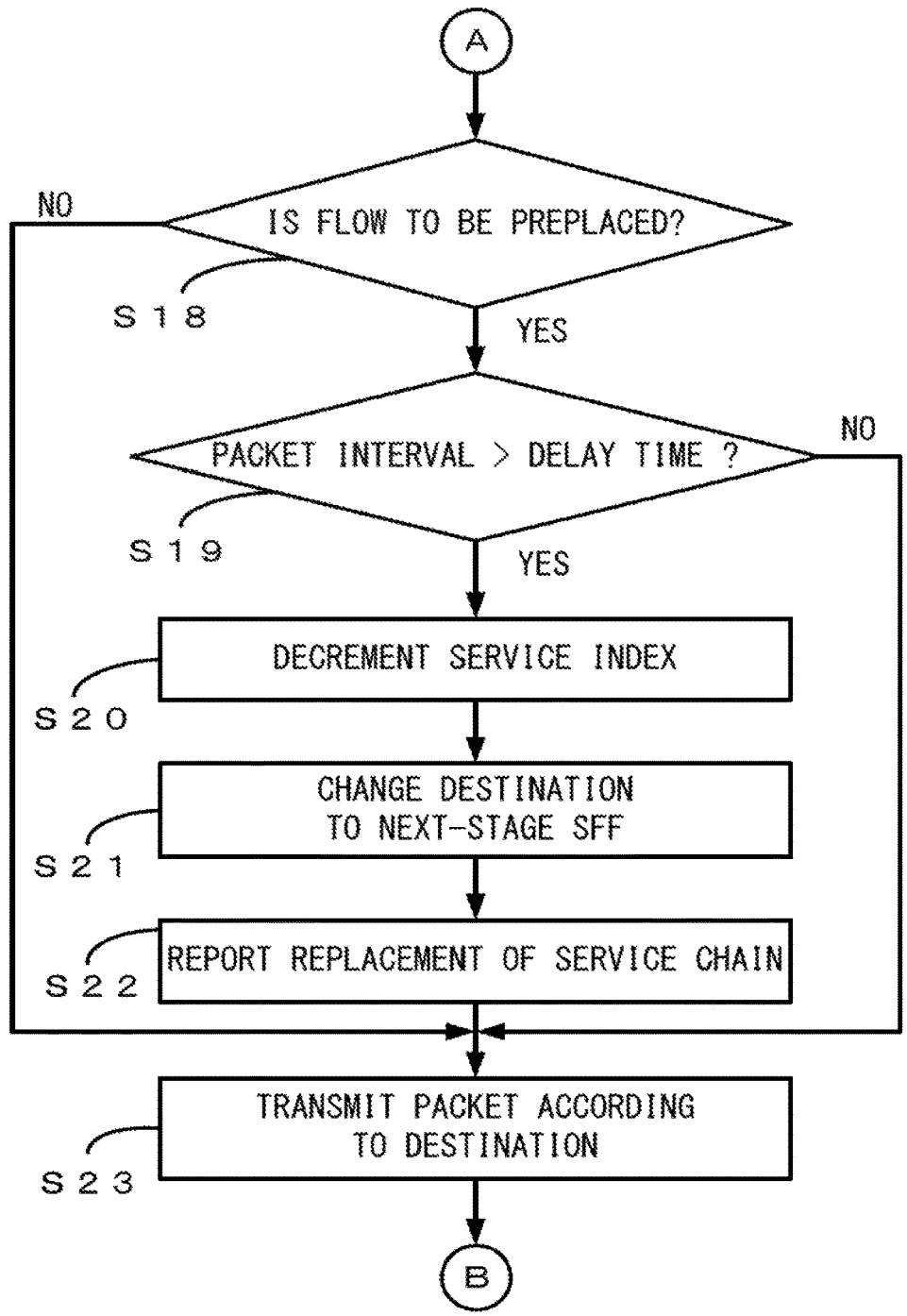
FIG. 17 is a flowchart (no. 3) illustrating an example of processing according to an embodiment.

An example of a flow of processing performed by the switch SW is described next with reference to FIGS. 16 and 17. An example of processing performed by the switch SW-1 is described below, but the same applies to processing performed by respective switches SW other than the switch SW-1.

The switch control unit 11 determines whether the packet receiver 15 has received a packet from the pre-stage switch SW-0 (step S11). When the packet has not been received (NO in step S11), processing returns to S11.

The switch control unit 11 determines whether the received packet is control information (step S12). As an example, the switch control unit 11 may determine whether the received packet is control information on the basis of whether the received packet is a BPDU.

As described above, the control information includes information relating to a delay time. When the received packet is control information (YES in step S12), the switch control unit 11 adds the information relating to the delay time to the replacement table stored in the switch storing unit 18 (step S13).

When the received packet is not control information (NO in step S12), the switch control unit 11 determines whether the received packet is a packet that makes a request to replace a service chain (step S14). In the embodiment, the packet is transmitted from the network controller 2.

When the received packet is a packet that makes a request to replace a service chain (YES in step S14), the switch control unit 11 adds a new entry to the replacement table (step S15).

The switch control unit 11 performs control to transmit a request to obtain a delay time to the server 5 (step S16). Then, processing returns to step S11.

When the received packet is not a packet that makes a request to replace a service chain (NO in step S14), the packet relay control unit 16 searches the replacement table (step S17). Then, processing moves on to "A".

Processing after "A" is described with reference to the example of FIG. 17. A communication flow that is a target for replacement of a service chain is specified according to "Flow" in the replacement table. The packet relay control unit 16 searches "Flow" in the replacement table, and determines whether the received packet is a packet in a flow that is a target for replacement of a service chain (step S18).

When the received packet is a packet in a flow that is a target for replacement (YES in step S18), the packet relay control unit 16 determines whether a packet interval is longer than a delay time (step S19).

When a packet interval is longer than a delay time (YES in step S19), the received packet is not transferred to the server 5. Because the packet is not transferred to the server 5, a communication efficiency can be suppressed from being reduced, and a load on the server 5 can be reduced. In this case, the packet interval is longer than the delay time, and therefore the order of respective packets included in the communication flow is maintained in an appropriate state.

In this case, the packet is not transferred to the server 5, and therefore the VNF 21 does not perform processing of a service function on the packet. Accordingly, the packet relay control unit 16 decrements a service index included in a header of the packet (step S20).

The first header updating unit 14 changes a destination of the packet in such a way that the packet is transmitted to a next-stage SFF (step S21). The switch control unit 11 performs control to transmit, to the network controller 2, a report indicating that the service chain has been replaced (step S22).

The packet transmitter 17 transmits the packet according to the destination (step S23). When the process of step S21 is performed, the destination of the packet is changed. Therefore, the packet is output via an output port to the next-stage SFF, and is transmitted to a next-stage switch SW.

When a packet interval is shorter than or equal to a delay time (NO in step S19), the received packet is not transferred to the server 5. This is because, if the received packet is transmitted to the next-stage switch SW, the order of respective packets included in the communication flow may fail to be maintained in an appropriate state.

When the determination result in step S19 is NO, the destination of the packet is not changed. In this case, the packet is transferred to the server 5. When the determination result in step S18 is NO, the received packet is not a packet in a flow that is a target for replacement of a service chain.

Because a service chain is not replaced, the order of the respective packets included in the communication flow does not need to be considered. Therefore, when the determination result in step S18 is NO, processing moves on to step S23, and the packet is transmitted according to the destination.

After the process of step S23 has been performed, processing moves on to "B". As illustrated in the example of FIG. 16, processing returns to step S11 via "B". The above describes processing performed by the switch SW according to the embodiment.

Figure 18:
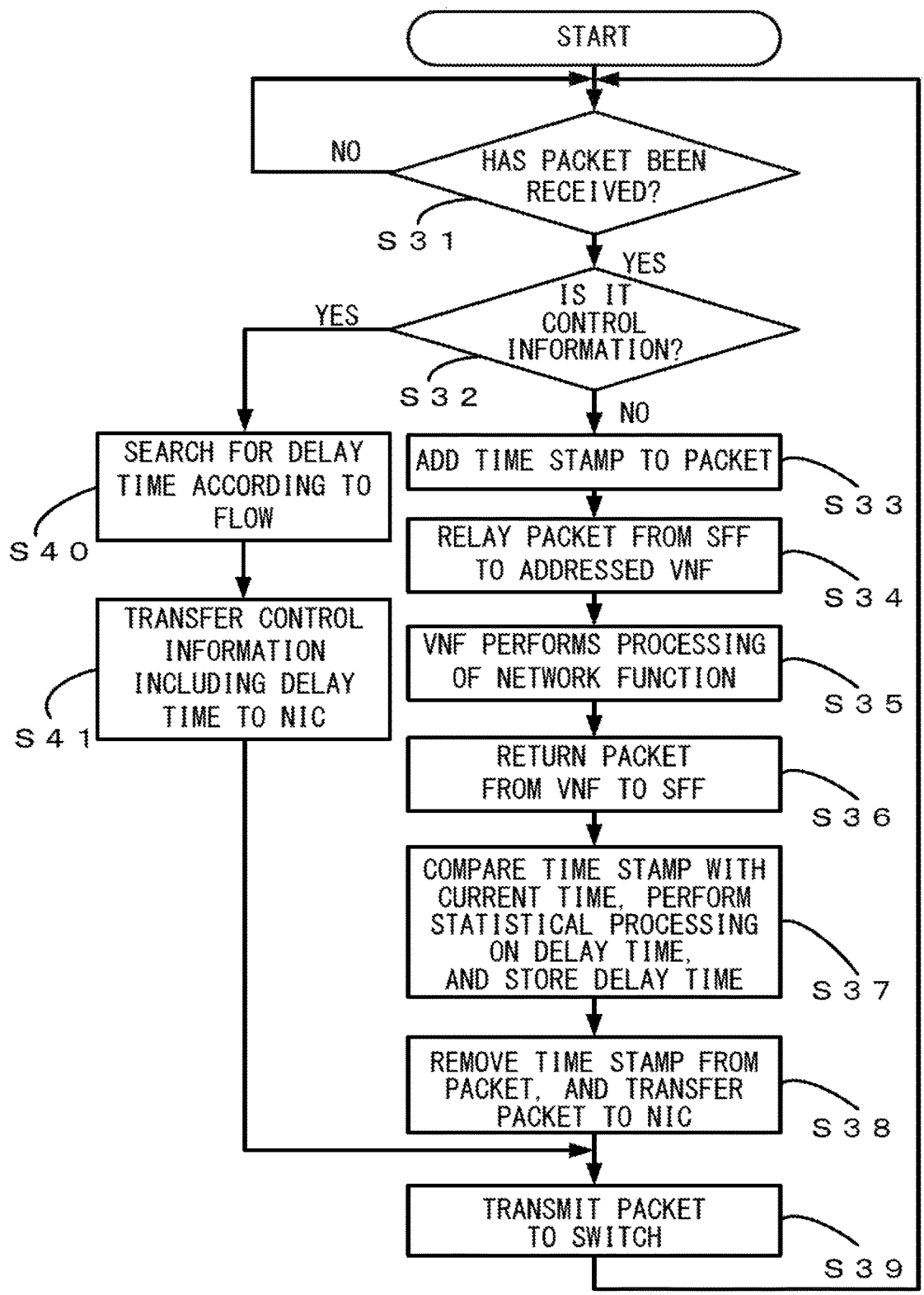
FIG. 18 is a flowchart (no. 4) illustrating an example of processing according to an embodiment.

An example of processing performed by the server 5 is described next with reference to FIG. 18. When the server 5 has not received a packet from the switch SW (NO in step S31), processing does not move on to the next step.

When the server 5 has received a packet (YES in step S31), the SFF 22 determines whether the packet is control information (step S32). When the packet is not control information (NO in step S32), the delay monitor 25 imparts time information (a time stamp) to the packet.

Consequently, the delay monitor 25 recognizes a time at which the packet was input to the SFF 22. The SFF 22 relays (outputs) the packet to the VNF 21 (step S34). The VNF 21 performs processing of a service function such as a firewall on the packet (step S35).

After the VNF 21 finishes the processing, the VNF 21 transmits the packet to the SFF (step S36). The delay monitor 25 recognizes, as a delay time, a time period between the time information (the time stamp) that has been imparted to the packet in step S33 and a current time.

When there are a plurality of packets to be monitored by the delay monitor 25, the delay monitor 25 performs statistical processing on delay times for the respective packets, associates the obtained delay time with information (a 5-tuple) specifying a communication flow, and stores the delay time and the information in the server storing unit 28 (step S37).

In the embodiment, the delay monitor 25 uses a mean value of delay times for respective packets as a delay time that is included in control information to be transmitted to the switch SW. In a case in which the VNF 21 performs processing of a service function on respective packets in a plurality of communication flows, a delay time for each of the communication flows is stored in the server storing unit 28.

The server 5 removes the time information (the time stamp) that has been imparted in step S33 from the packet, and transfers the packet to a network interface card (NIC) of the server 5 (step S38). Consequently, the packet is transmitted to the switch (step S39).

When the determination result in step S32 is YES, the packet received by the server 5 is a packet indicating control information. In this case, the delay information reporting unit 26 specifies a communication flow on the basis of "Flow Info" in the control information, and searches the server storing unit 28 for a delay time for the communication flow (step S40).

The delay information reporting unit 26 transfers the packet that is the control information including the delay time to the NIC (step S41). Consequently, the packet that is the control information is transmitted to the switch SW. The above describes processing performed by the server 5 according to the embodiment.

Application Example 1

Figure 19:
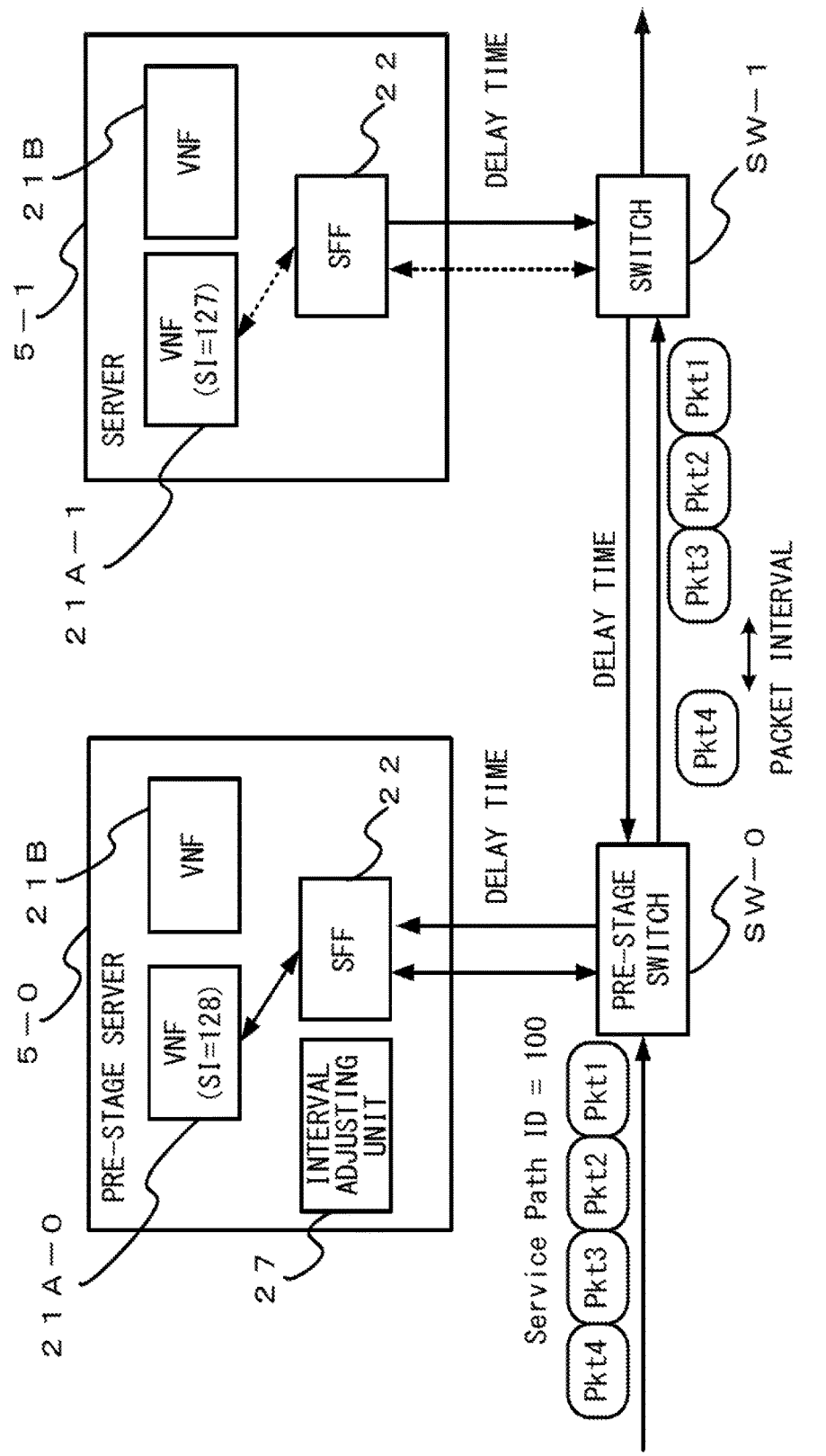
FIG. 19 illustrates an example of replacement of a service chain in Application Example 1.

Application Example 1 is described next. In the example of FIG. 19, it is assumed that a server 5-1 is excluded from the service chain and a pre-stage server 5-0 is not excluded from the service chain, according to a service chain is replaced.

In the example of FIG. 19, respective packets in a communication flow that is received by the pre-stage switch SW-0 are continuous, and there is almost no packet interval between each two adjacent packets. Accordingly, in Application Example 1, the interval adjusting unit 27 of the pre-stage server 5-0 adjusts a packet interval of any packet of the respective packets included in the communication flow.

The pre-stage server 5-0 is not a target to be excluded from the service chain. Accordingly, the pre-stage switch SW-0 transfers each of the received packets to the pre-stage server 5-0. The VNF 21A-0 performs processing of a service function on each of the packets transferred to the server 5-0.

The respective packets on which the VNF 21A-0 has performed processing of a service function are output to the SFF 22. The interval adjusting unit 27 adjusts a packet interval between any of the packets output to the SFF 22 and a corresponding preceding packet.

The switch SW-1 transmits, to the pre-stage switch SW-0, control information including a delay time generated by the VNF 21 of the pre-stage server 5-1. As an example, the switch SW-1 transmits, to the pre-stage switch SW-0, a delay time in the replacement table stored in the switch storing unit 18.

The pre-stage switch SW-0 transmits the control information including the delay time to the SFF 22 of the pre-stage server 5-0. Consequently, the SFF 22 and the interval adjusting unit 27 of the pre-stage server 5-0 obtain the delay time.

The interval adjusting unit 27 of the server 5-0 adjusts a packet interval for any of the packets when each of the packets included in the communication flow is output from the SFF 22 to the VNF 21A-0, or when each of the packets included in the communication flow is output from the VNF 21A-0 to the SFF 22.

In the case of the example of FIG. 19, for example, the interval adjusting unit 27 transitorily stores (buffers), in the buffer 29, each of the packet "Pkt4" and the packets that follow in the communication flow. The interval adjusting unit 27 sequentially transmits the packets stored in the buffer 29 in a prescribed time period.

It is assumed that the prescribed time period is longer than at least the delay time that has been obtained from the post-stage switch SW-1. Accordingly, a packet interval that is longer than a delay time due to processing of a service function performed by the VNF 21 of the post-stage server 5-1 is generated between the packets "Pkt3" and "Pkt4".

Because the packet "Pkt4" is transmitted after the packet "Pkt4" is stored in the buffer 29 during a prescribed time period, the packets that follow the packet "Pkt4" are also transmitted after buffering during the prescribed time period. Consequently, packet intervals between two adjacent packets are adjusted.

In the case of Application Example 1, packets are buffered in the buffer 29. The buffer 29 has a larger storage capacity than that of the switch SW. In addition, the packets buffered in the buffer 29 are transmitted after a prescribed time period has passed, and the packets are deleted from the buffer 29. Accordingly, a storage capacity that is employed in the buffer 29 may be small.

The server 5-0 stores a correspondence relationship between the communication flow and the delay time for the server 5-1 in the server storing unit 28 in a table form. FIG. 20 illustrates an example of the table (a delay information table).

FIG. 19 illustrates an example in which the interval adjusting unit 27 adjusts a packet interval between the packets "Pkt3" and "Pkt4", but the interval adjusting unit 27 may adjust a packet interval between two arbitrary adjacent packets included in a communication flow. As an example, the interval adjusting unit 27 may adjust a packet interval between the packets "Pkt1" and "Pkt2".

Figure 21:
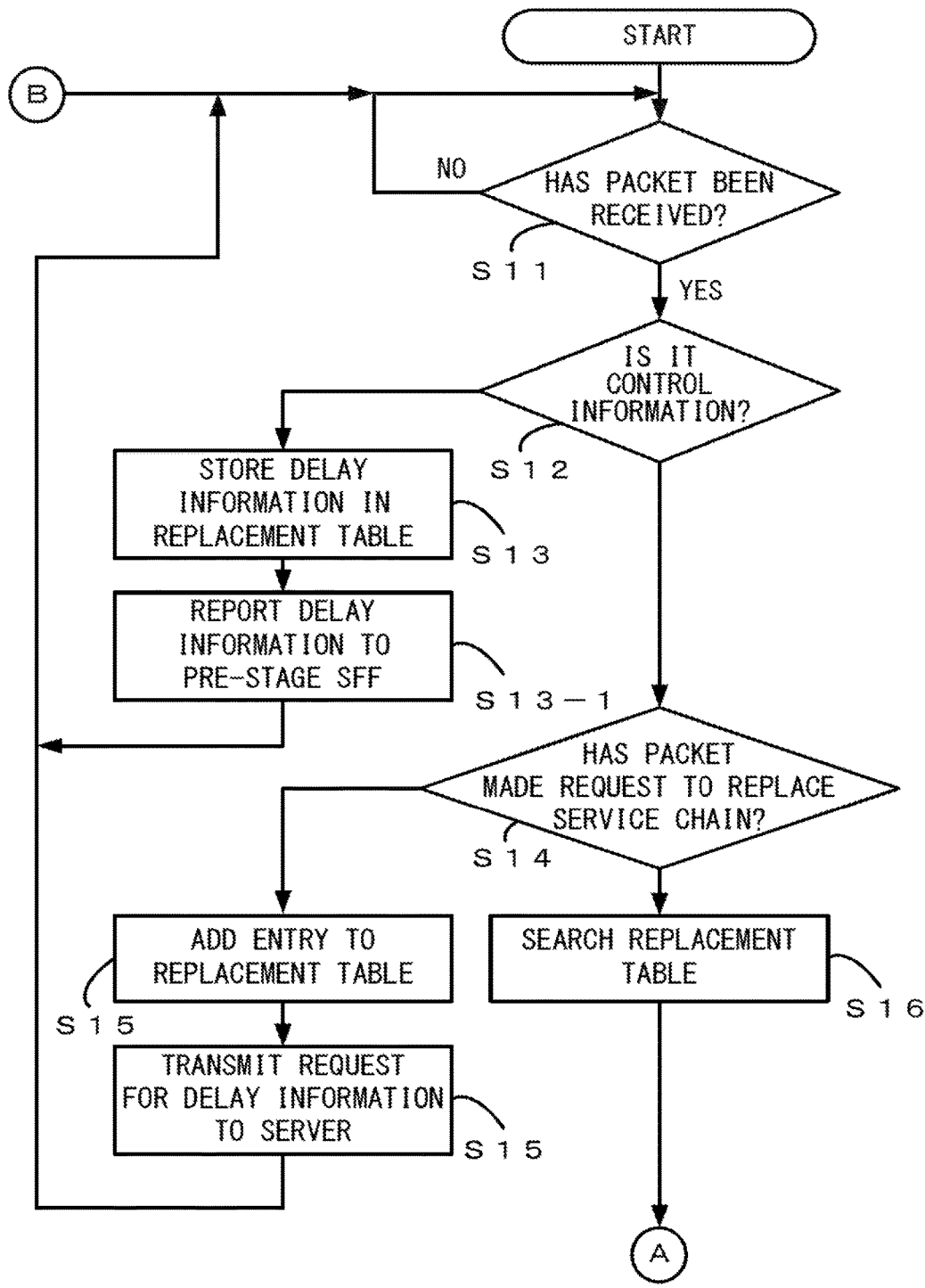
FIG. 21 is a flowchart (no. 1) illustrating an example of processing in Application Example 1.

A flow of processing in Application Example 1 is described next with reference to the flowcharts of FIGS. 21 to 23. FIG. 21 is a flowchart illustrating a flow of processing performed by the switch SW-1. In this flowchart, processes other than the process of step S13-1 are similar to the processes above according to the embodiment, and therefore the description thereof is omitted.

As described above, the interval adjusting unit 27 of the server 5-0 adjusts a packet interval according to the delay time generated by the next-stage VNF 21. With respect to the server 5-1, the delay information reporting unit 26 of the server 5-1 reports control information including the delay time to the SFF 22 of the pre-stage server 5-0 (step S13-1).

In the embodiment, the delay information reporting unit 26 references the replacement table stored in the switch storing unit 18, and transmits, to the pre-stage switch SW-0, information relating to a delay time that corresponds to a communication flow, and the switch SW-0 transfers the information relating to the delay time to the pre-stage server 5-0.

Figure 22:
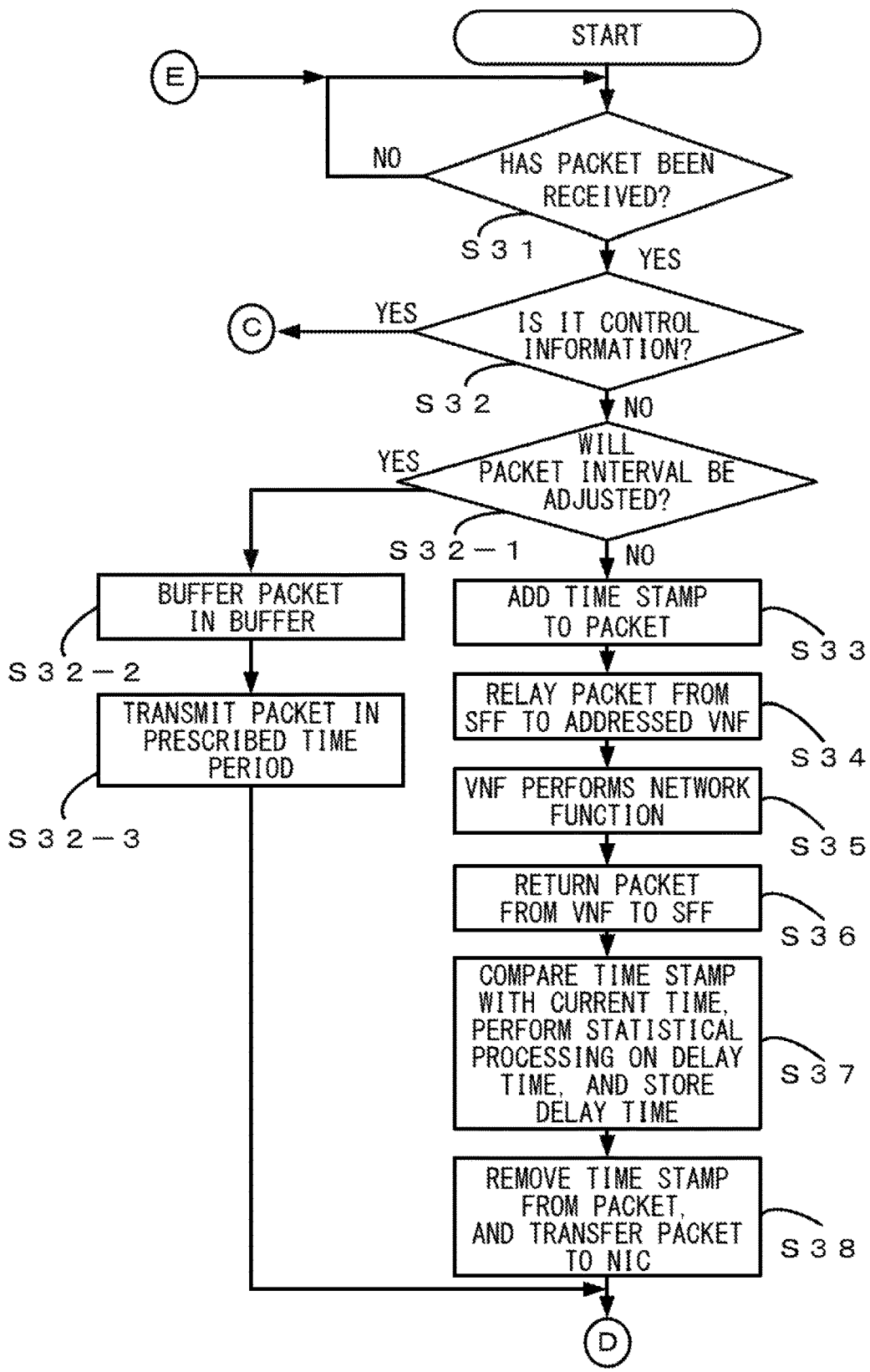
FIG. 22 is a flowchart (no. 2) illustrating an example of processing in Application Example 1.
Figure 23:
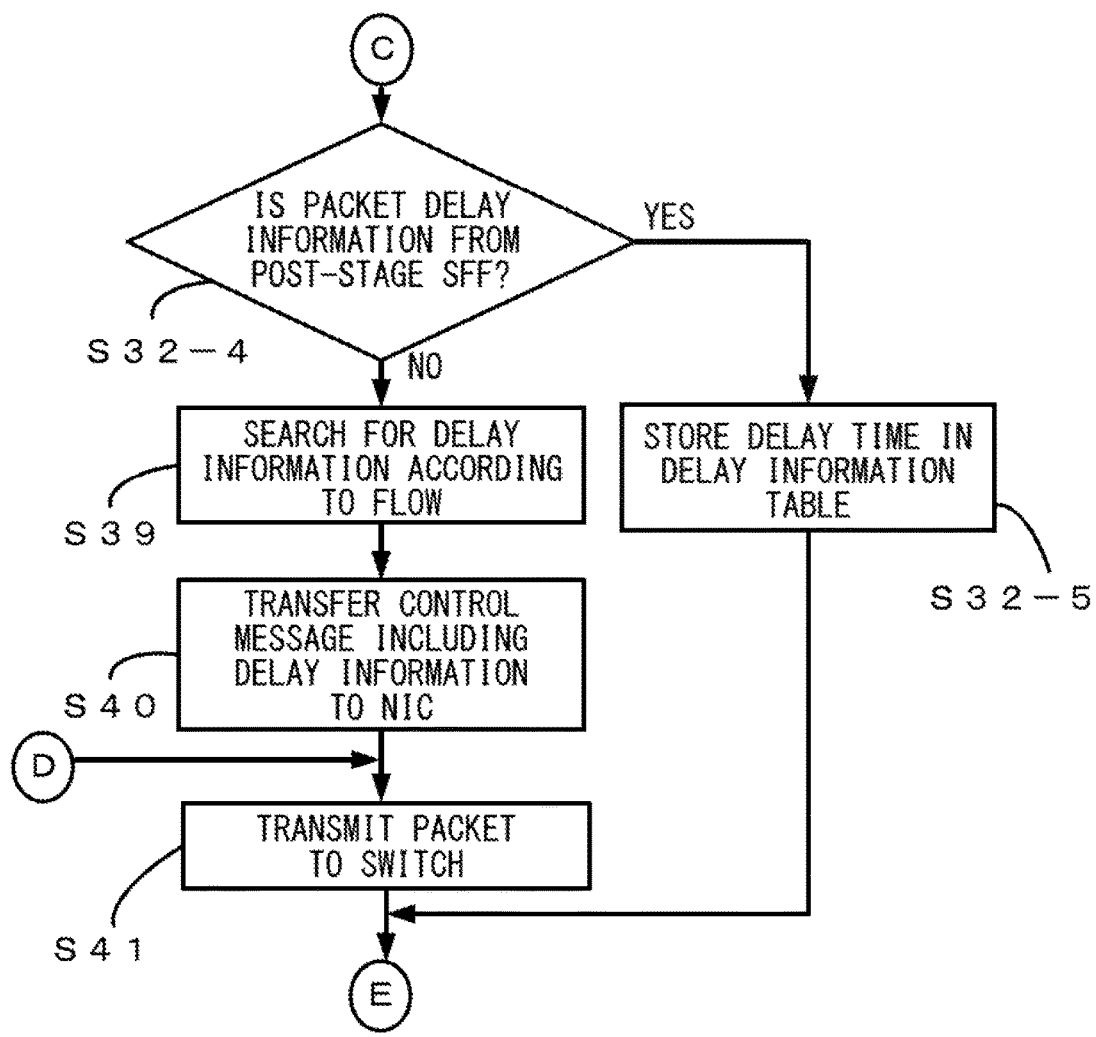
FIG. 23 is a flowchart (no. 3) illustrating an example of processing in Application Example 1.

FIG. 22 is a flowchart illustrating a flow of processing performed by the server 5 (the server 5-0). In this flowchart, processes other than the processes of step S32-1 and S32-2 are similar to the processes above according to the embodiment, and therefore the description thereof is omitted.

The interval adjusting unit 27 determines whether a packet interval will be adjusted (step S32-1). As described above, a packet interval to be adjusted may be a packet interval between two adjacent packets included in a communication flow.

As an example, when the interval adjusting unit 27 adjusts a packet interval between the packets "Pkt3" and "Pkt4", the packet "Pkt4" and the packets that follow are targets for adjustment of a packet interval. In this case, the interval adjusting unit 27 determines that a packet interval will be adjusted for each of the packet "Pkt4" and the packets that follow.

As an example, in a case in which a packet interval between any two adjacent packets of the respective packets included in a communication flow is longer than a delay time, the order of the respective packets included in the communication flow is maintained in an appropriate stage even when the packet interval is not adjusted. In this case, the interval adjusting unit 27 may determine that a packet interval will not be adjusted.

In a case in which all of the packet intervals for the respective packets included in the communication flow are shorter than or equal to a delay time, the interval adjusting unit 27 may determine that the packet intervals will be adjusted. By adjusting the packet intervals so as to become longer than the delay time, the order of the respective packets included in the communication flow is maintained in an appropriate state.

Processing in a case in which a packet interval will not be adjusted is similar to the processing above according to the embodiment. In a case in which a packet interval will be adjusted (YES in step S32-1), the interval adjusting unit 27 buffers the packet in the buffer 29 (step S32-2).

The interval adjusting unit 27 transmits the packet stored in the buffer 29 in a prescribed time period (step S32-3). The prescribed time period is a time period that is longer than the delay time. The transmitted packet is deleted from the buffer 29.

The interval adjusting unit 27 clears an entry of a flow that corresponds to the packet in the delay information table stored in the server storing unit 28. Then, processing moves on to "D".

In the process of step S32, when the received packet is a packet indicating control information (YES in step S32), processing moves on to "C". Processes after "C" and "D" are described with reference to the flowchart of FIG. 23.

The server control unit 23 determines whether the received packet indicating the control information indicates information relating to a delay time obtained from the SFF 22 of the post-stage server 5-1 (a server 5 in a post-stage of the pre-stage server 5-0) (step S32-4).

When the received control information is information relating to a delay time obtained from the SFF 22 of the post-stage server 5 (YES in step S32-4), the server control unit 23 stores the delay time in the delay information table (step S32-5).

When the received control information is not information relating to the delay time obtained from the SFF 22 of the post-stage server 5 (NO in step S32-4), the processes of steps S39 and S40 are performed.

As described above, the packet is stored in the buffer 29, and the stored packet is transmitted in a prescribed time period. Then, processing moves on to step s41 via "D". Namely, the transmitted packet is transmitted to the switch SW-1.

As described above, respective packets that follow the packet buffered in the buffer 29 are also buffered, and are transmitted in a prescribed time period.

Application Example 2

Figure 24:
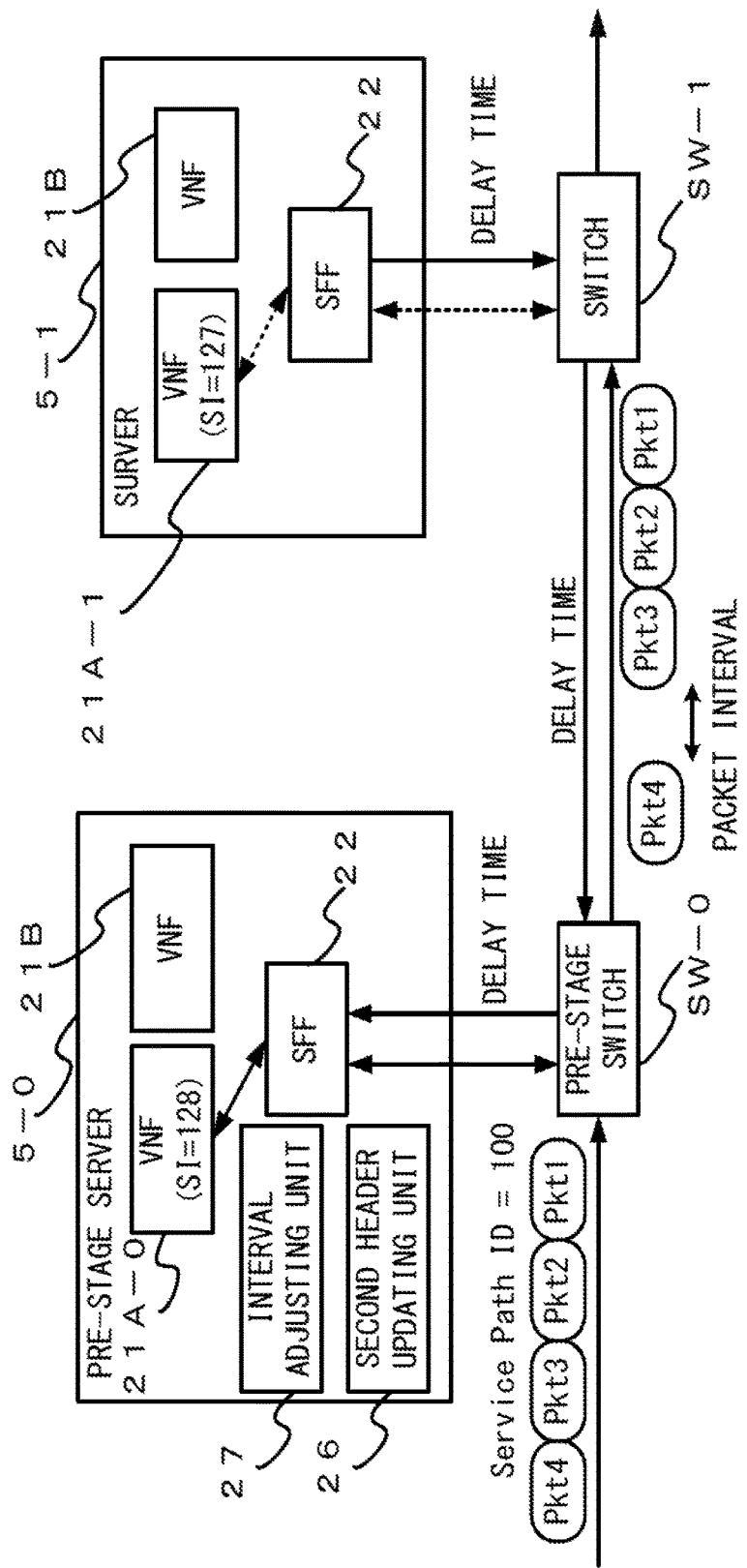
FIG. 24 illustrates an example of replacement of a service chain in Application Example 2.

Application Example 2 is described next. As illustrated in the example of FIG. 24, in Application Example 2, the interval adjusting unit 27 adjusts packet intervals between two respective adjacent packets by buffering any of the respective packets included in a communication flow, similarly to Application Example 1.

The adjusted packet interval between two adjacent packets is longer than the obtained delay time. Therefore, respective packets that follow the buffered packet are not transferred to the server 5-1 that is excluded from a service chain.

Accordingly, the second header updating unit 24 of the pre-stage server 5-0 changes the destinations of the respective packets that follow the buffered packet to a server 5-2 that is the second server that follows the pre-stage server 5-0.

Consequently, the packets are not transferred to the server 5-1 (the VNF 21 of the server 5-1) that is excluded from the service chain. In this case, the switch SW-1 does not perform packet transfer control according to a delay time and a packet interval.

In Application Example 2, the pre-stage server 5-0 performs packet transfer control according to a delay time and a packet interval, while the switch SW-1 performs the packet transfer control in Application Example 1. Also in this case, the order of respective packets included in a communication flow can be maintained in an appropriate state.

FIG. 25 illustrates an example of a delay information table in Application Example 2. The delay information table is stored in the server storing unit 28 of the server 5-0. The delay information table includes the items "Flow", "Service Path ID", "Service Index" "SFF Address that is Two Ahead", and "Interval Adjustment".

The item "SFF Address that is Two Ahead" indicates the address of the SFF 22 of the server 5-2 that is the second server that follows the server 5-0. The item "Interval Adjustment" indicates whether the adjustment above between packets has been completed.

Figure 26:
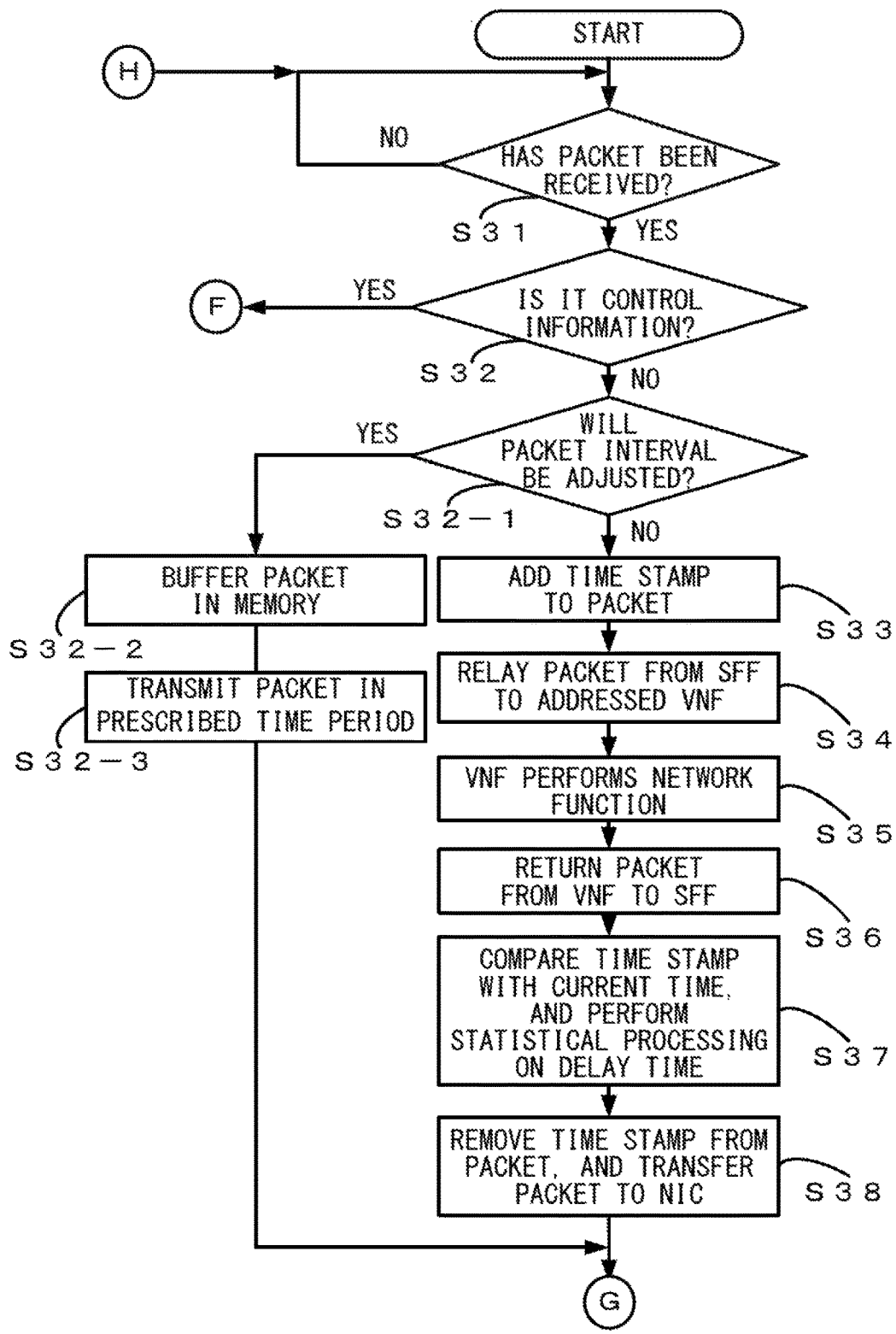
FIG. 26 is a flowchart (no. 1) illustrating an example of processing in Application Example 2.

A flow of processing in Application Example 2 is described next with reference to the flowcharts of FIGS. 26 and 27. Respective processes in the flowchart of FIG. 26 are similar to the respective processes described above with reference to the flowchart of FIG. 22, and therefore the description thereof is omitted.

When the received packet is a packet indicating control information in the process of step S32 (YES in step S32), processing moves on to "F". After the process of step S32-3 or S38 is finished, processing moves on to "G".

Figure 27:
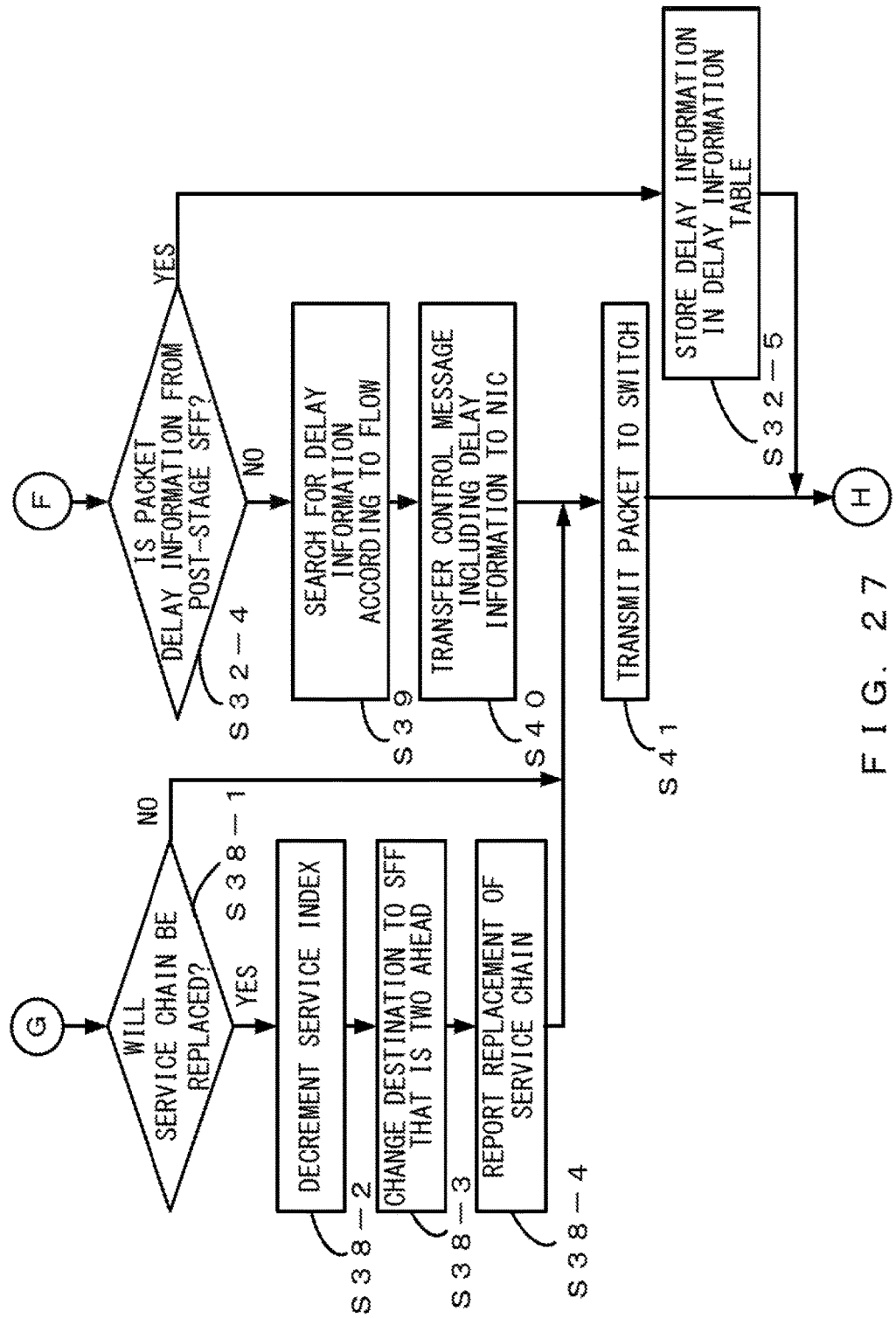
FIG. 27 is a flowchart (no. 2) illustrating an example of processing in Application Example 2.

Respective processes after "F" in the example of FIG. 27 are similar to the processes described above with reference to FIG. 22. Respective processes after "G" are described.

The SFF 22 determines whether a packet is a packet in a communication flow that is a target for replacement of a service chain (step S38-1). When the determination result in step S38-1 is YES, the SFF 22 decrements a service index included in a header of the packet (step S38-2).

The VNF 21A-0 of the server 5-0 performs processing of a service function on the packet, and therefore the service index included in the header of the packet is decremented.

Further, in step S38-3, the service index is decremented such that a value of the service index decreases by 2 from an original value. Consequently, the destination of the packet is changed to the SFF 22 of the server 5-2 that is the second server that follows the server 5-0 (step S38-3).

The SFF 22 of the server 5-0 reports to the network controller 2 that the service chain has been replaced (step S38-4). Then, the packet is transmitted to the switch SW-0.

After the process of step S41 or S32-5 is performed, processing moves on to step S31 of FIG. 26 via "H". The above describes processing in Application Example 2.

Application 3

Application 3 is described next. In the embodiment above, a replacement table for each flow is stored in the switch storing unit 18 of the switch SW. As illustrated in the example of FIG. 28, the replacement table for each of the flows stores delay information for each of the flows.

A delay time of each of the VNFs 21 may be stored in the switch storing unit 18 of the switch SW. The delay time for each of the VNFs 21 is sometimes known. In this case, the server 5 does not need to monitor the delay time by the switch SW storing the delay time, and therefore the configuration of the server 5 can be simplified.

<An Example of the Hardware Configuration of a Switch>

Figure 29:
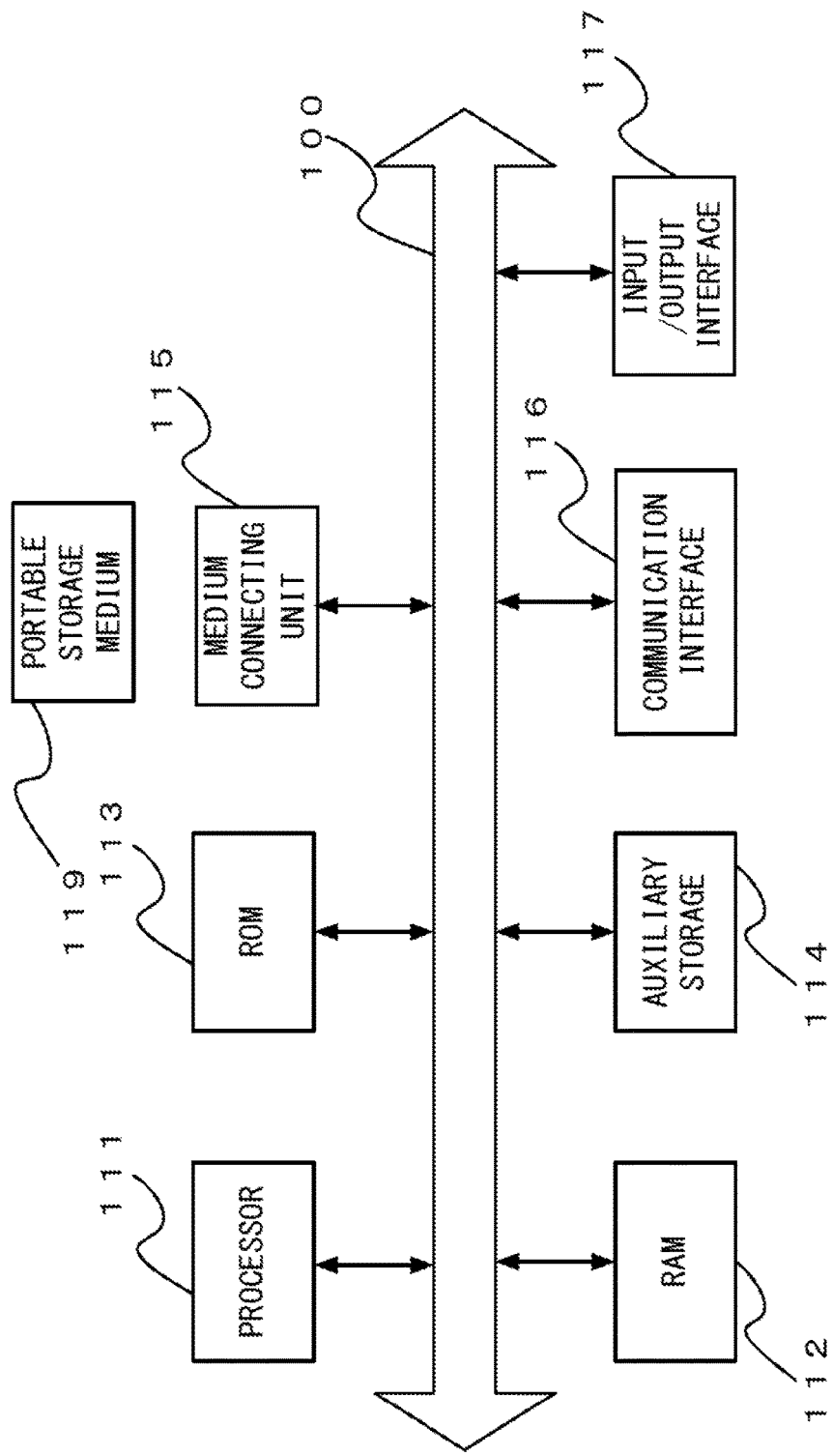
FIG. 29 illustrates an example of the hardware configuration of a switch.

An example of the hardware configuration of the switch SW is described next with reference to the example of FIG. 29. As illustrated in the example of FIG. 29, a processor 111, a random access memory (RAM) 112, a read only memory (ROM) 113, an auxiliary storage 114, a medium connecting unit 115, and a communication interface 116 are connected to a bus 100.

The processor 111 is an arbitrary processing circuit. The processor 111 executes a program expanded in the RAM 112. A program for performing processing according to the embodiment may be employed for the executed program. The ROM 113 is a non-volatile storage that stores the program expanded in the RAM 112.

The auxiliary storage 114 is a storage that stores various types of information, and, as an example, a hard disk drive, a semiconductor memory, or the like may be employed for the auxiliary storage 114. The medium connecting unit 115 is provided so as to be connectable to a portable recording medium 119.

A portable semiconductor memory or the like may be employed for the portable recording medium 119. A program for performing processing according to the embodiment may be stored in the portable recording medium 119.

Respective units other than the packet receiver 15, the packet transmitter 17, and the switch storing unit 18 in the switch SW may be implemented by the processor 111 executing a given program.

The packet receiver 15 and the packet transmitter 17 may be implemented by the communication interface 116. The communication interface 116 may be the NIC described above. The switch storing unit 18 may be implemented by the RAM 112, the auxiliary storage 114, or the like.

The functions of respective units other than the switch control unit 11 and the switch storing unit 18 in the switch SW may implemented, for example, by a prescribed integrated circuit (an application specific integrated circuit (ASIC)).

All of the RAM 112, the ROM 113, the auxiliary storage 114, and the portable recording medium 119 are examples of a computer-readable tangible storage medium. These tangible storage media are not transitory media such as a signal carrier.

<An Example of the Hardware Configuration of a Server>

Figure 30:
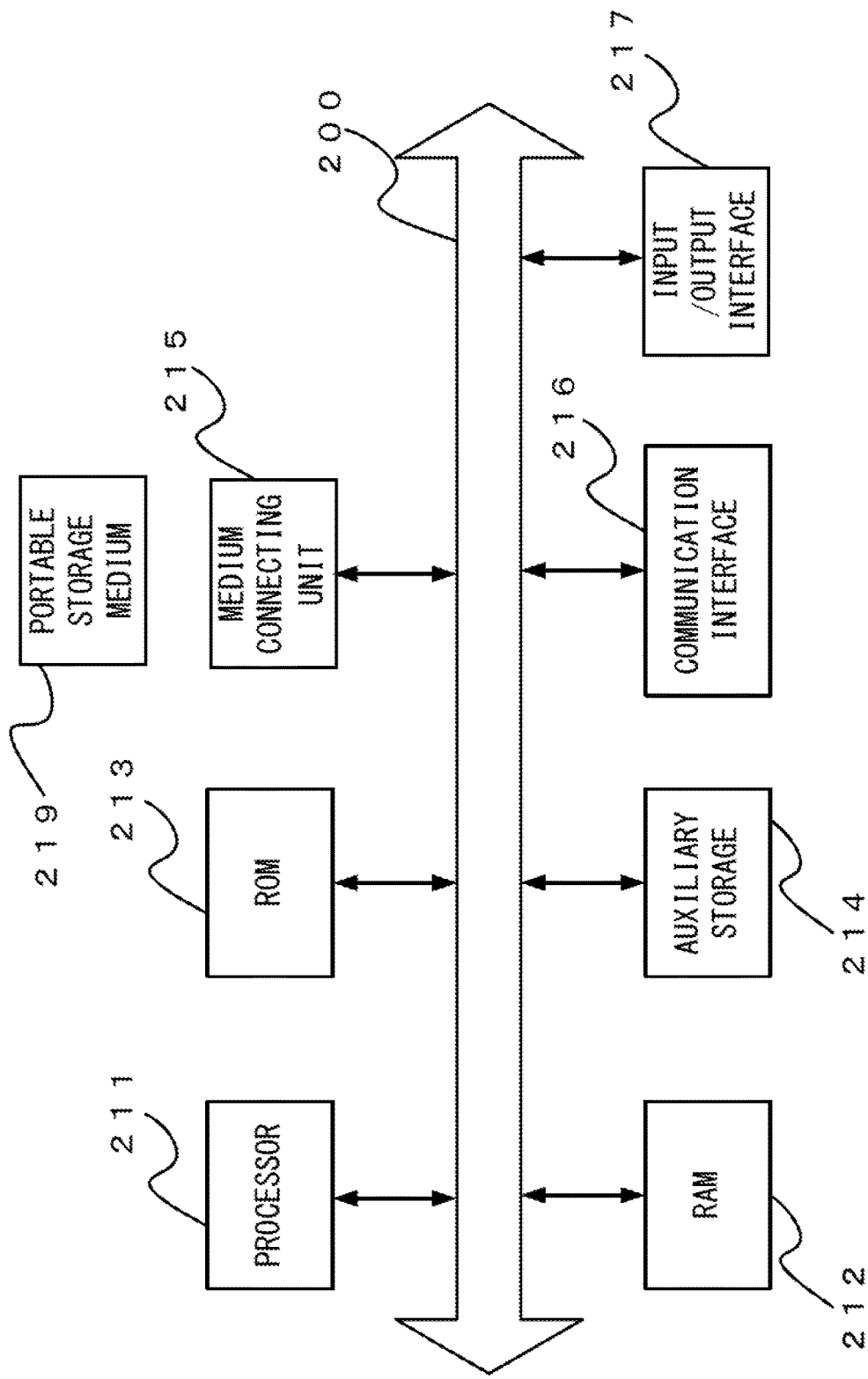
FIG. 30 illustrates an example of the hardware configuration of a server.

An example of the hardware configuration of the server 5 is described next with reference to the example of FIG. 30. As illustrated in the example of FIG. 30, a processor 211, a RAM 212, a ROM 213, an auxiliary storage 214, a medium connecting unit 215, and a communication interface 216 are connected to a bus 200.

The processor 211 is an arbitrary processing circuit. The processor 211 executes a program expanded in the RAM 212. A program for performing processing according to the embodiment may be employed for the executed program. The ROM 213 is a non-volatile storage that stores the program expanded in the RAM 212.

The auxiliary storage 214 is a storage that stores various types of information, and, as an example, a hard disk drive, a semiconductor memory, or the like may be employed for the auxiliary storage 214. The medium connecting unit 215 is provided so as to be connectable to a portable recording medium 219.

A portable semiconductor memory, an optical disk, or the like may be employed for the portable recording medium 219. A program for performing processing according to the embodiment may be recorded in the portable recording medium 219.

In the server 5, respective units other than the server storing unit 28 and the buffer 29 may be implemented by the processor 211 executing a given program. The server storing unit 28 and the buffer 29 may be implemented by the RAM 212, the auxiliary storage 214, or the like.

All of the RAM 212, the ROM 213, the auxiliary storage 214, and the portable recording medium 219 are examples of a computer-readable tangible storage medium. These tangible storage media are not transitory media such as a signal carrier.

<Others>

In the embodiment and the respective applications described above, the switch SW and the server 5 have been described to be different devices from each other. However, the switch SW and the server 5 may be a single device. As an example, when the function of the switch SW is implemented by software, the server 5 may execute the function of the switch SW.

According to the embodiment above, the order of respective packets in a communication flow that are transferred to service functions of a virtualized network can be maintained in an appropriate state.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A packet relaying method conducted by a computer, the packet relaying method comprising:
    comparing a time interval between two adjacent packets of a plurality of packets with a delay time that is a time period of processing performed by a first service function of a plurality of service functions of a virtualized network, when a first node that includes the first service function is excluded from a transfer route of the plurality of packets, the first node being included in a transfer route; and
    controlling whether each of the plurality of packets is transferred to the first node based on a result of the comparing.

2. The packet relaying method according to claim 1, wherein when the time interval between the two adjacent packets is shorter than or equal to the delay time, a received packet is transferred to the first node, and when the time interval between the two adjacent packets is longer than the delay time, the received packet is transferred to a second node that performs a second service function, that is a service function, next to the first service function, indicated by the received packet.

3. The packet relaying method according to claim 2, wherein the first node, that performs the first service function performs:
    measuring the delay time due to the first service function that is performed on a packet that has been received from a communication control device that controls whether a packet is transferred to the first node; and
    reporting the measured delay time to the communication control device.

4. The packet relaying method according to claim 3, wherein the first node performs statistical processing on a plurality of the measured delay times, and reports a delay time obtained by performing the statistical processing to the communication control device.

5. The packet relaying method according to claim 1, wherein the delay time is stored in a communication control device that controls whether a packet is transferred to the first node.

6. The packet relaying method according to claim 1, wherein
the packet includes information relating to a number of service functions that the packet goes through, and
when the packet is processed by the first service function, and when the packet is not transferred to the first node, the number of service functions that the packet goes through is decremented.

7. The packet relaying method according to claim 3, wherein the information processing device performs:
obtaining the delay time due to a node that is a next transfer destination of the received packet; and
adjusting the time interval between the two adjacent packets so as to be longer than the obtained delay time.

8. The packet relaying method according to claim 7, wherein the information processing device buffers a packet for which the time interval is adjusted during a time period that is longer than the obtained delay time.

9. The packet relaying method according to claim 7, wherein the first node changes a destination of a packet for which the time interval has been adjusted in such a way that the packet is not transferred to the first node that has been excluded from the transfer route.

10. The packet relaying method according to claim 9, wherein
the packet includes information relating to a number of service functions that the packet goes through, and
when the destination of the packet is changed, the number of service functions that the packet goes through is decremented by 2.

11. A non-transitory computer-readable recording medium having stored therein a packet relaying program for causing a computer to execute a process comprising:
comparing a time interval between two adjacent packets of a plurality of packets with a delay time that is a time period of processing performed by a first service function of a plurality of service functions of a virtualized network, when a first node that includes the first service function is excluded from a transfer route of the plurality of packets, the first node being included in a transfer route; and
controlling whether each of the plurality of packets is transferred to the first node based on a result of the comparing.

* * * * *